Feb. 13, 1962 — F. G. STEELE — 3,021,064
ORDERED TIME INTERVAL COMPUTING SYSTEMS
Filed May 24, 1955 — 8 Sheets-Sheet 1
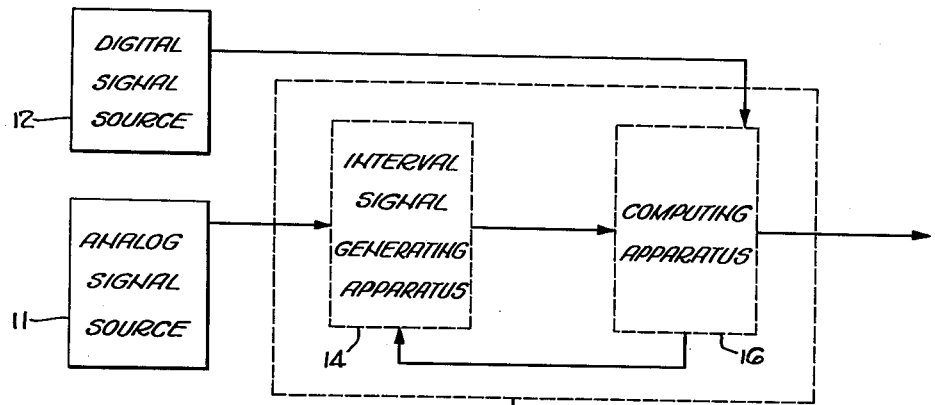
Fig. 1.
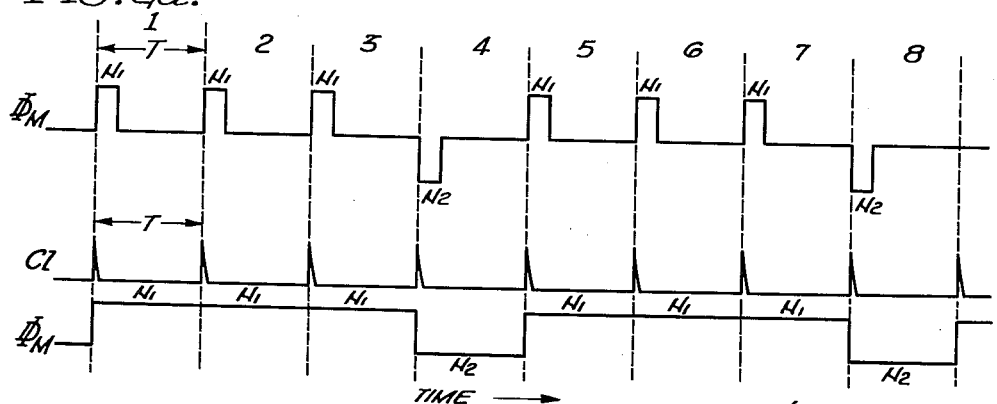
Fig. 2a.
Fig. 2b.
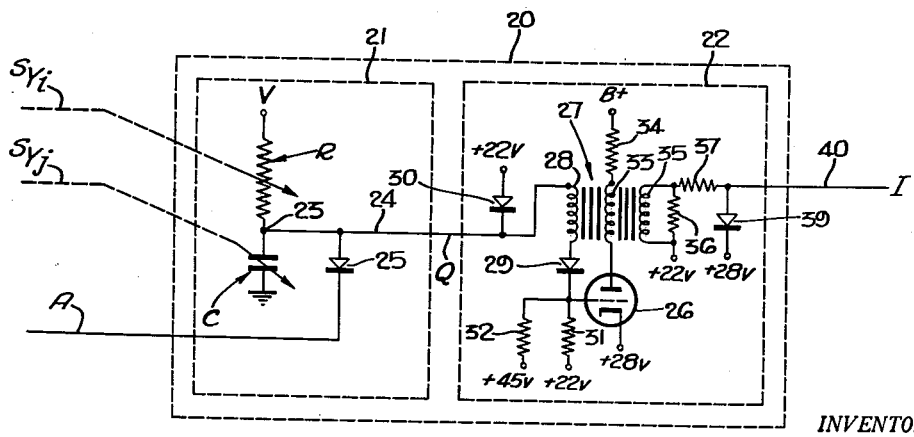
Fig. 3.
INVENTOR,
FLOYD G. STEELE
BY
Seymour M. Greenberg
ATTORNEY

INVENTOR,
FLOYD G. STEELE

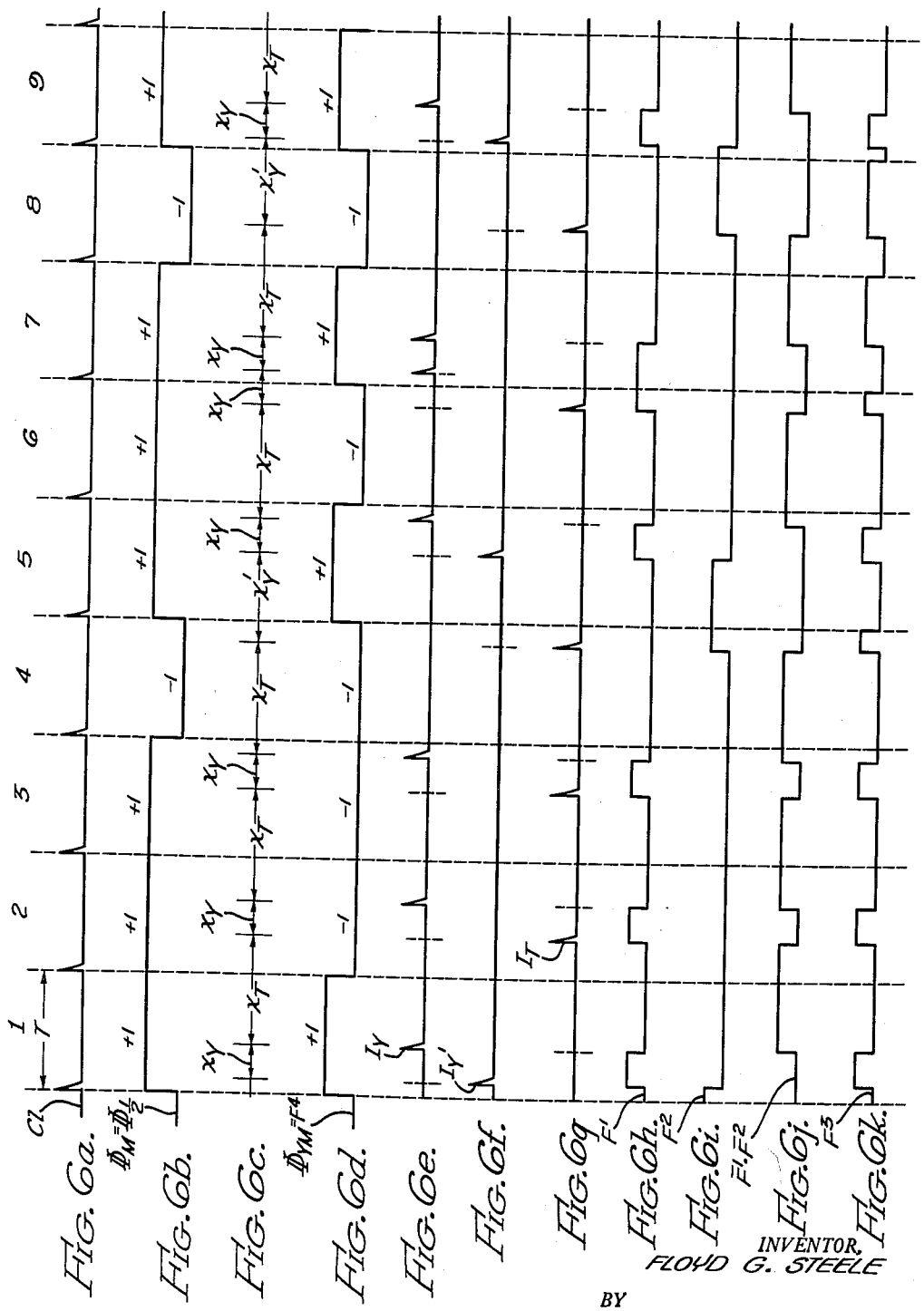

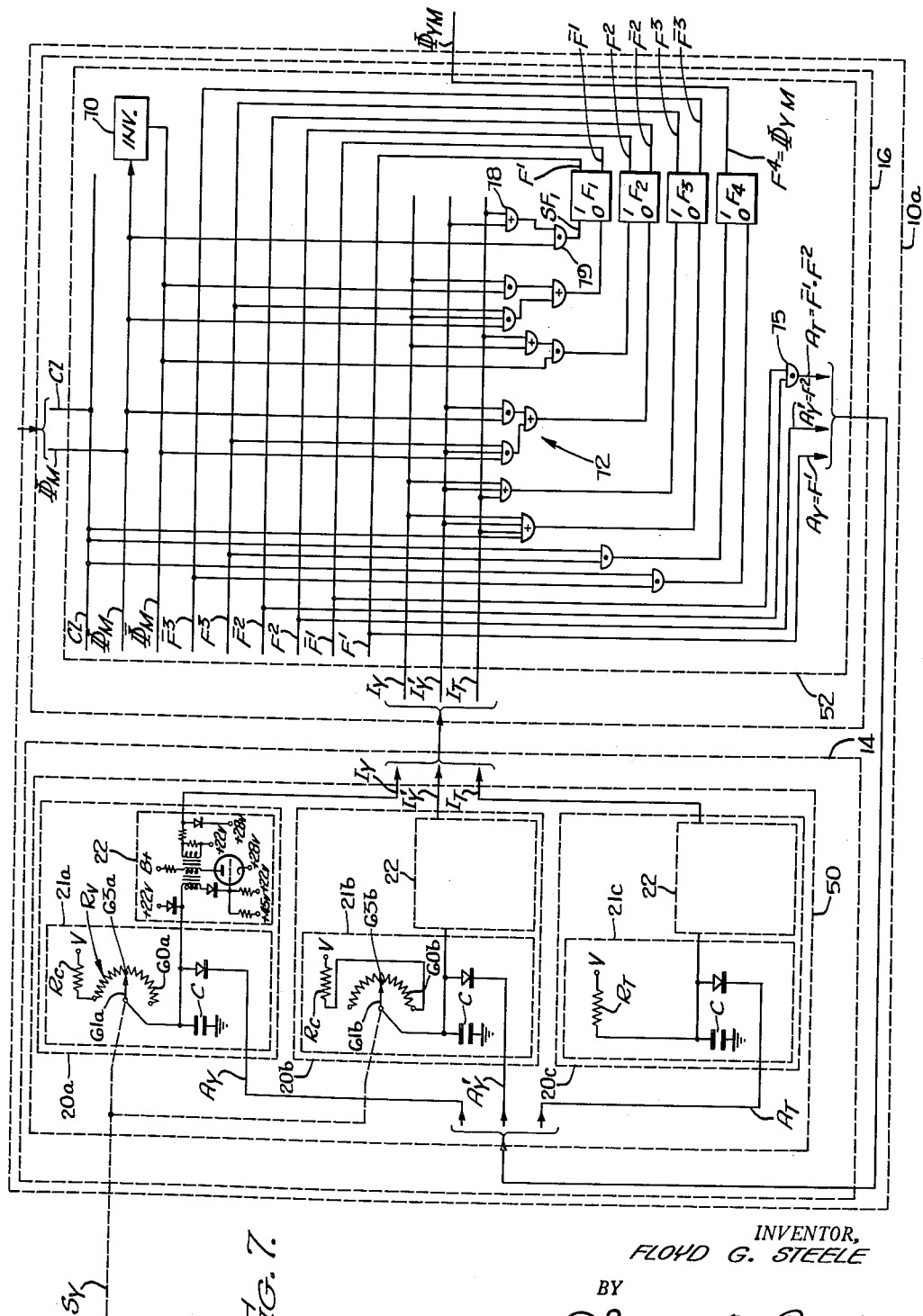

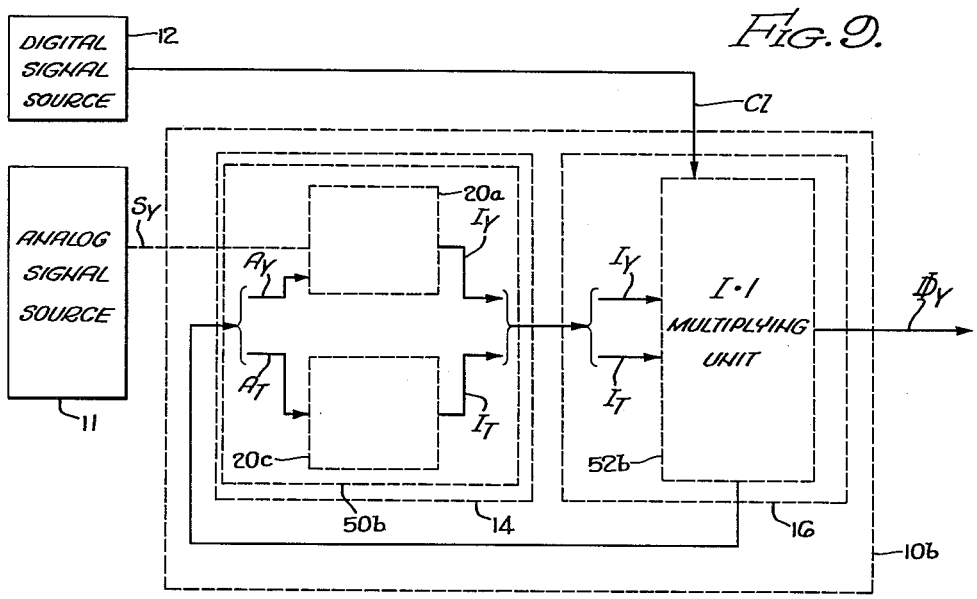
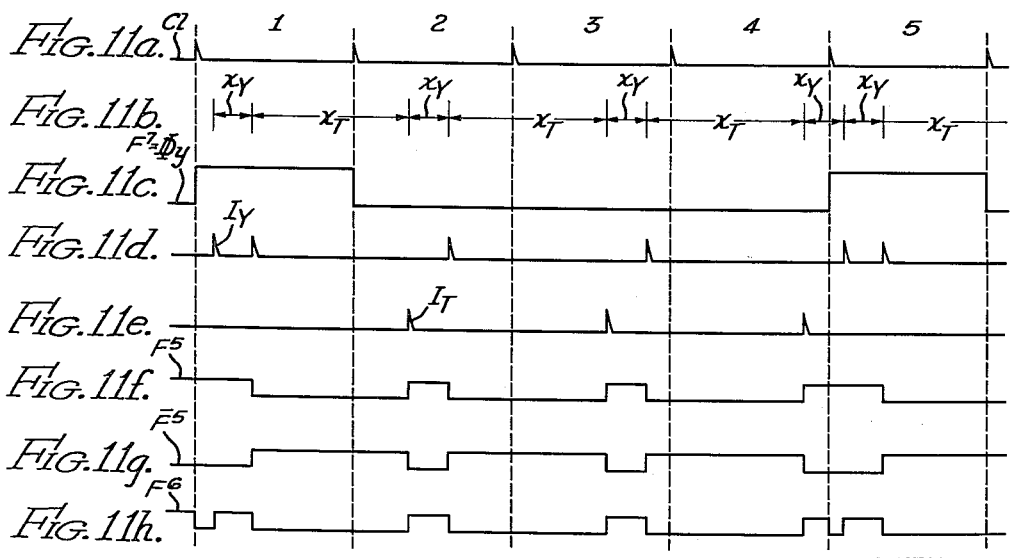

INVENTOR,
FLOYD G. STEELE
BY
Seymour M. Rosenberg
ATTORNEY

Feb. 13, 1962              F. G. STEELE              3,021,064

ORDERED TIME INTERVAL COMPUTING SYSTEMS

Filed May 24, 1955                         8 Sheets-Sheet 7

INVENTOR,
FLOYD G. STEELE
BY
ATTORNEY

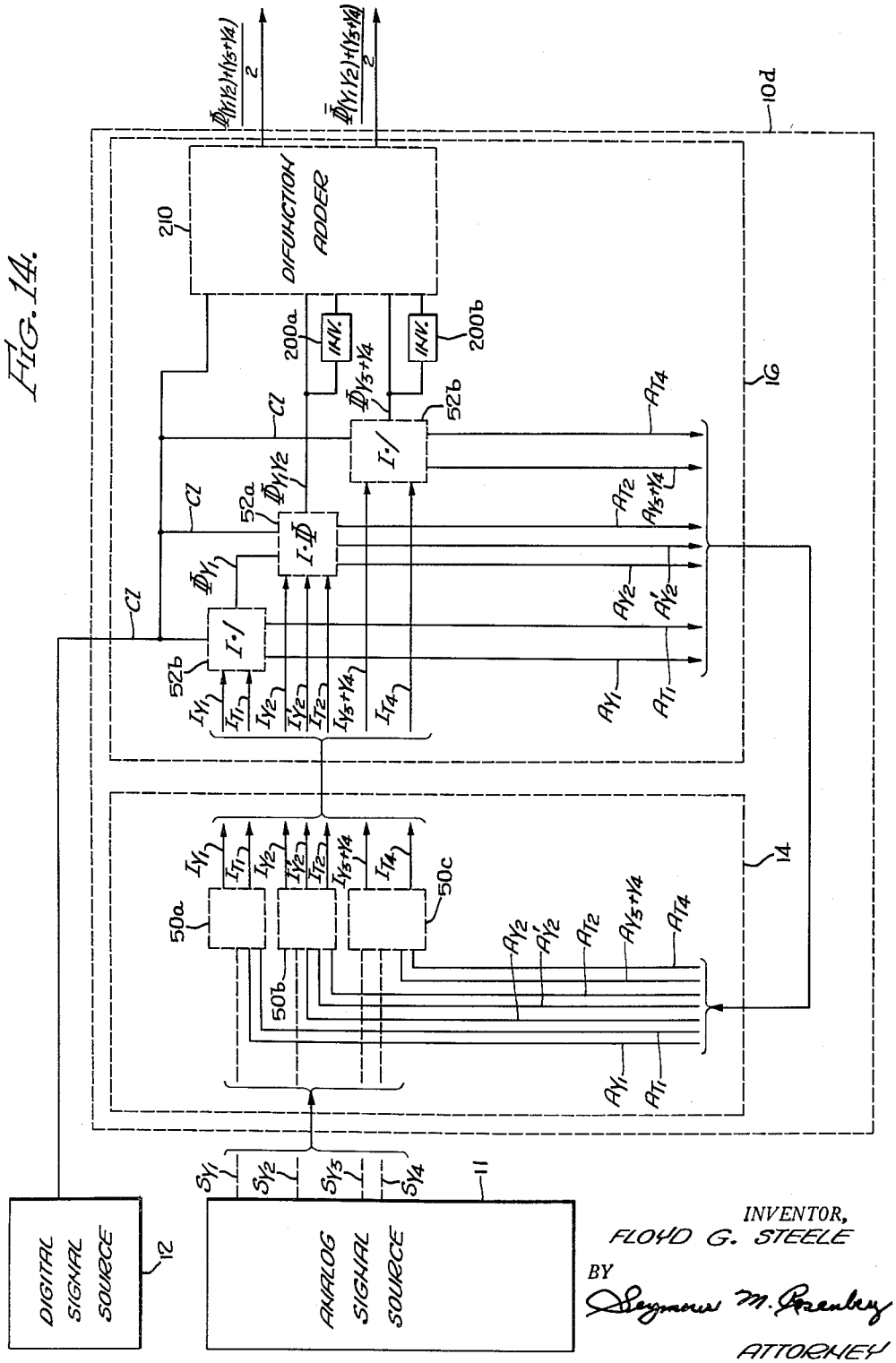

United States Patent Office 3,021,064
Patented Feb. 13, 1962

3,021,064
ORDERED TIME INTERVAL COMPUTING
SYSTEMS
Floyd G. Steele, La Jolla, Calif., assignor to Digital
Control Systems, Inc., La Jolla, Calif.
Filed May 24, 1955, Ser. No. 510,736
29 Claims. (Cl. 235—154)

The present invention relates to electronic digital computing systems and more particularly to computing systems wherein mathematical quantities are represented by "ordered" electrically marked time intervals.

The word "ordered" is used in two senses in connection with the electrically marked time intervals of the present invention. In one sense the word "ordered" refers to the fact that the electrically marked time intervals of the present invention are initiated only when called for (or ordered). In its second sense the word "ordered" refers to the fact that in the operation of computing systems mechanized according to the present invention, electrically marked time intervals are sequentially produced in accordance with systematic schemes of computation in which arrangement or order of the time intervals is important as well as the duration of the time intervals.

It is noted that in the private writings of the present inventor, computation with ordered time intervals according to the present invention is often termed "neuron computation." This designation rests upon a conjecture that there is a parallel between the fundamental operations of animal nervous systems and the fundamental operations of computing systems mechanized according to the present invention. The conjectured analogy will not be pursued here however for the reason that relatively little is definitely known of the mode of operation of animal nervous systems and therefore further consideration of the analogy could not contribute to understanding of the novel mode of operation associated with the present invention.

Ordered time intervals representing quantity magnitudes may be "electrically marked" in a number of different ways. For example, an ordered time interval may be electrically presented as the time differences between a pair of electrical pulses or as the time duration between the rise or fall of a voltage level. A typical generator of electrically marked ordered time intervals representing a quantity magnitude responds to an applied actuating signal ("marking" the beginning of an ordered time interval) by delivering at some time interval thereafter an output signal ("marking" the end of the ordered time interval). The duration of the ordered time interval defined in this manner by the electrical marks is proportional to the quantity magnitude represented by the time interval and varies in accordance with the variations of that quantity magnitude.

Time interval generators of the general type described have been developed which can receive analog input signals from measuring instruments or other sources and will thereafter, when commanded to do so, produce electrically marked time intervals whose duration correspond respectively to the magnitudes of the analog input signals. Moreover with certain embodiments of these time interval generators, a signal generator may receive analog input signals from a number of instruments or other sources and may act as a fairly complicated computer, in itself, in that the duration of electrically marked time intervals produced by the generator will represent the result of a predetermined mathematical operation upon the quantities represented by the analog input signals. For example, the duration of time intervals produced by a generator receiving a pair of analog input signals may be proportional to the sum, product, or other mathematical function of quantities represented by the analog signals.

Thus in overall operation, time interval generators of the type described may accomplish a conversion of quantities represented by input signals to equivalent time interval form or they may accomplish mathematical operations upon these quantities before conversion to time interval form. Since conversion of a quantity to equivalent time interval forms is merely a special type of mathematical operation, it may be said that the overall function of time interval generators of the type described is to produce upon order electrically marked time intervals representing predetermined mathematical functions of quantities represented by analog input signals applied to the generators.

Given a number of time interval generators, each conditioned for the production of a quantity representing time interval, further mathematical operations may be formed upon the quantities represented by the time intervals by calling upon the generators to produce their electrically marked time intervals in orderly sequences in accordance with systematic schemes of computation in which the sequencing as well as the duration of the time intervals is important in determining a final result.

In one example shown in the present application, a converting system is described in which through ordered sequencing of the type described, time intervals representing a quantity Y are transformed to an equivalent difunction signal train representing the same quantity Y. In another example shown in the present application, a multiplying system is described in which time intervals representing the quantity Y are sequenced or ordered under the control of a difunction signal train representing a quantity M to produce an output difunction signal train representing the product YM obtained by multiplying the quantities Y and M.

In still another example a first time interval is converted to an equivalent difunction signal train which is then applied to a multiplier which operates upon a second time interval to produce a resultant difunction signal train which effectively represents the product of the quantities represented by the first and second time intervals. In other computing systems shown in the present application even more complex mathematical operations are performed through combined use of initial computing operations in time interval generators preceding the formation of electrically marked time intervals and succeeding computing operations performed by sequencing or ordering of the time intervals thus made available.

For those who are not familiar with the relatively recent development of digital computation with difunction signal trains, a section of the present application has been devoted hereinbelow to an explanation of the manner in which difunction signal trains are employed for the nonnumerical representation of mathematical quantities. As will be disclosed in more detail hereinafter, the term difunction signal train refers to a train of bivalued signals, each having either a first value representing a first number or a second value representing a second number. In contrast to numerical code signal trains customarily used in the prior art in which each signal represents a digit of a number, each like valued signal in a difunction train has the same weight or significance. Accordingly a difunction signal train represents a quantity non-numerically since the signals of the train are unweighted and therefore do not correspond to the digits of any number.

It has been found that virtually all computational operations can be performed with difunction signal trains. The use of difunction computation has led to significant advances in the field of automatic control and the solution of mathematical equations. U.S. Patent No. 2,898,040 for "Computer and Indicator System," issued August 4, 1959, to the present inventor is one reference disclosing the application of difunction representation to the field of automatic process control while U.S. application Serial No. 388,780 for "Electronic Digital Differential Analyzer," filed by the same inventor on October 28, 1953, discloses the use of difunction signal trains for communication between the integrator sections of a digital differential analyzer.

It is a matter of some historical interest that the impetus for the present invention of computation with ordered time intervals arose from a need for a new type of input conversion device for control computers utilizing difunction computational techniques. In a prior art difunction control computer, information as to the displacement or position of a movable member such as a rotatable shaft was ordinarily not supplied to the central computing sections of the computer. Instead a difunction signal train was developed (through the use of an input conversion device termed a quantizer—see U.S. Patent No. 2,733,430 for "Angular Quantizer," issued January 31, 1956, to the same inventor), which represented the rate of change of displacement of the member. If information as to the total displacement of the member were desired the input difunction signal train would be continuously integrated to provide the desired positional data. The use of quantizers is obviously inappropriate when position is the quantity primarily desired as with relatively slowly varying members. Therefore a need arose for some means of converting displacement or positional signals directly to equivalent difunction form with a minimum amount of circuitry or other equipment. The time interval to difunction converter mentioned hereinbefore provided a highly successful solution to this problem. In accordance with the invention a very simple time interval generator coupled to the movable member will produce ordered time intervals representing member displacement which can be readily converted to an equivalent difunction signal with a very simple and cheap electrical circuit described hereinbelow.

However the conception of the positional to difunction converter was merely a first step in the perceiving of the basic concepts of the present invention. For example, it is clear that the basic methods described for manipulating or ordering time intervals to produce desired mathematical results are independent of the precise nature of the time interval generators and are also independent of nature of the factors which control the durations of the ordered time intervals. Thus in some embodiments of the invention time interval durations may be controlled by means other than by analog signals without affecting the basic nature of the circuits which manipulate and order these time intervals. These manipulative operations upon ordered time intervals will in fact be generic to embodiments of the invention having widely differing types of time interval generators.

Moreover in automatic control computers the possibility of performing by simple means exceedingly complex computation within the time interval generators preliminary to the production of time intervals promises to greatly reduce equipment complexity. It now appears probable that through association of ordered time interval computation and the prior art difunction computation electronic digital control computers will be reduced in size and weight to the point where they can be utilized in many applications for which they were hitherto unsuitable.

It is therefore an object of the present invention to provide an electronic digital computing system wherein mathematical quantities are represented by electrically marked time intervals initiated only in response to predetermined actuating signals.

It is another object of the present invention to provide an electronic digital computing system wherein mathematical quantities are represented by electrically marked time intervals initiated only in response to predetermined actuating signals and thereafter combined to produce a final mathematical result in the form of a bivalued electrical signal train.

It is still another object of the present invention to provide an electronic digital computing system wherein electrically defined ordered time intervals representing corresponding mathematical quantities are combined with a difunction signal train representing an additional mathematical quantity to produce an output difunction signal train representing a predetermined function of the mathematical quantities.

It is another object of the present invention to provide an electrical computing system operable upon a number of analog signals representing corresponding input quantities, and including interval generating apparatus receiving the analog signals and selectively actuable for producing a plurality of electrical interval signals at corresponding time intervals after actuation proportional to predetermined mathematical functions of the input quantities and also including means responsive to the interval signals for producing an electrical output signal train representative of a predetermined function of the time intervals defined by said interval signals.

It is yet another object of the present invention to provide an electronic multiplier for operating upon electrically marked time intervals representing a first quantity and a bivalued electrical signal train representing a second quantity to produce a bivalued electrical signal train representing the product of said first and second quantities.

It is a further object of the present invention to provide an electronic converter for converting an electrically marked time interval representing a mathematical quantity into an equivalent difunction signal train representing the mathematical quantity.

It is still a further object of the present invention to provide an electronic converter for converting an electrically marked time interval having a duration representing an algebraic number into an equivalent difunction signal train representing the algebraic number, said converter being essentially a multiplier wherein the algebraic number is effectively multiplied by the quantity one represented in equivalent difunction form.

It is yet another object of the present invention to provide an electrical converting system for representing the magnitude of an analog quantity as a difunction signal train, said converting system including a first interval generating means selectively actuable for generating a first electrical interval signal at a time interval after actuation representative of the magnitude of the analog quantity, and a signal generating means receiving the interval signals and producing said difunction signal train in response thereto.

It is yet a further object of the present invention to provide a time interval signal generator for generating in response to an applied actuating signal an electrical time interval signal having a duration proportional to the impedance of a variable impedance element which is varied in impedance magnitude in accordance with the condition of a variable condition input instrument.

It is still another object of the present invention to provide a selectively operable time interval signal generator actuable in response to an applied input signal for generating an electrical interval signal at a time interval after actuation proportional to a predetermined mathematical function of a plurality of input quantities represented by a corresponding plurality of analog input signals, the time interval being proportional to a predetermined mathematical function of the magnitudes of a corresponding plurality of variable magnitude impedance elements respectively controlled by said analog signals.

The novel features which are believed to be characteristic of the invention both as to its organization and method of operation together with further objects and advantages thereof, will be better understood from the following description considered in connection with the following drawings in which several embodiments of the invention are illustrated by way of example. It is to be expressly understood, however, that the drawings are for the purpose of illustration and description only and are not intended as a definition of the limits of the invention.

FIG. 1 is a generic block diagram of an electrical computing system according to the present invention which is utilized for operating upon analog signals to produce a bilevel electrical output signal train representative of a predetermined mathematical function of input quantities represented by the analog signals;

FIGS. 2a and 2b are waveform diagrams drawn on a common time scale illustrating two equivalent types of difunction signal trains representing respectively two equivalent forms of a difunction signal train representing a fixed mathematical quantity;

FIG. 3 is a circuit diagram illustrating one form of time interval generator adapted for operating upon analog input signals to produce upon order an electrically marked time interval representing a predetermined mathematical function of quantities represented by the analog input signals;

Figure 5:
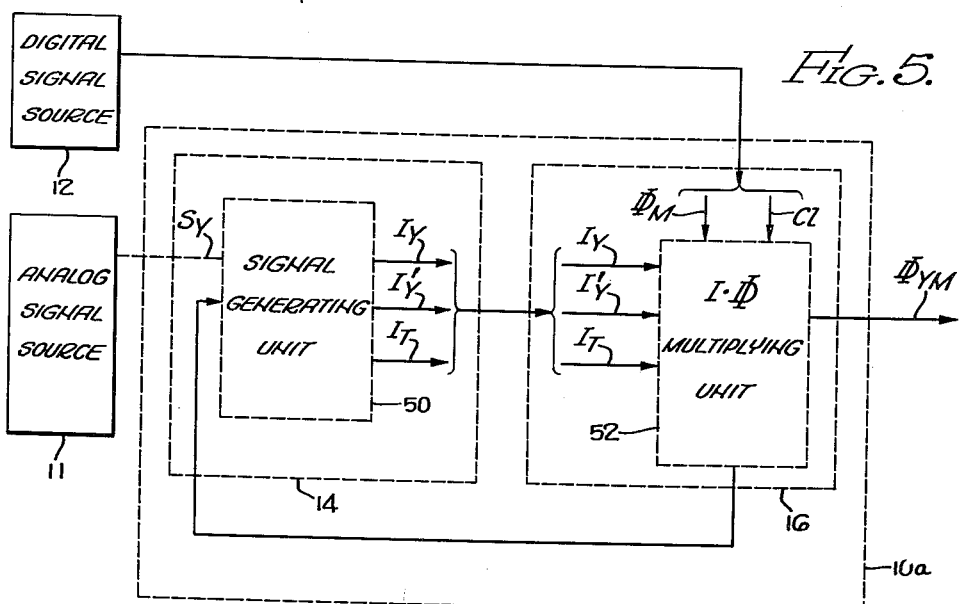
FIG. 5 is a block diagram illustrating a particular embodiment of the computing system shown in FIG. 1 which functions essentially as a multiplying system by producing an output difunction signal train which represents the product of two quantities respectively represented by an analog input signal and an input difunction signal train.
Figure 8:
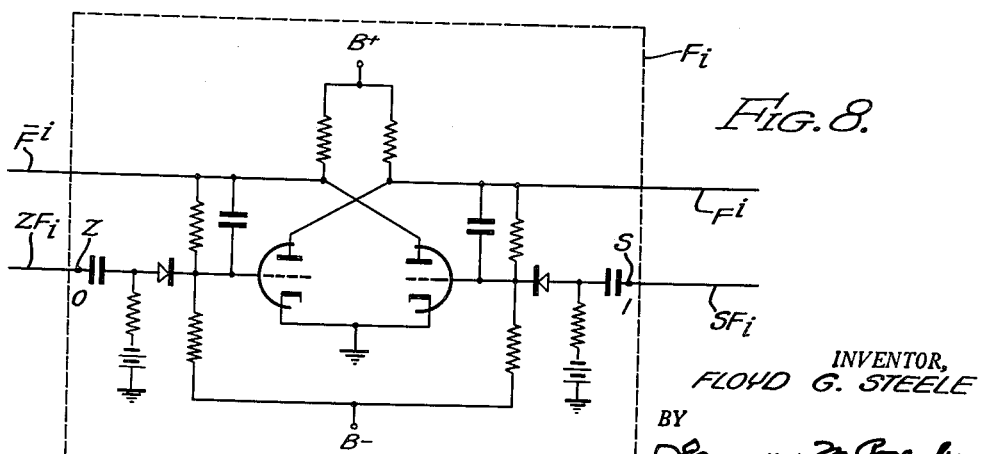
Figure 10:
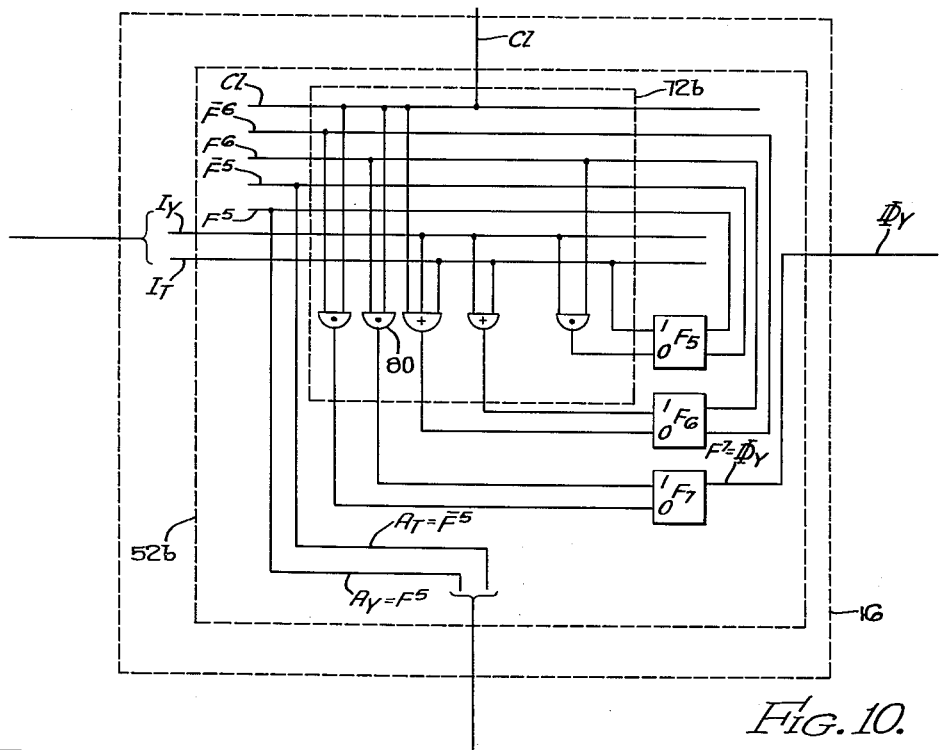
Figure 12:
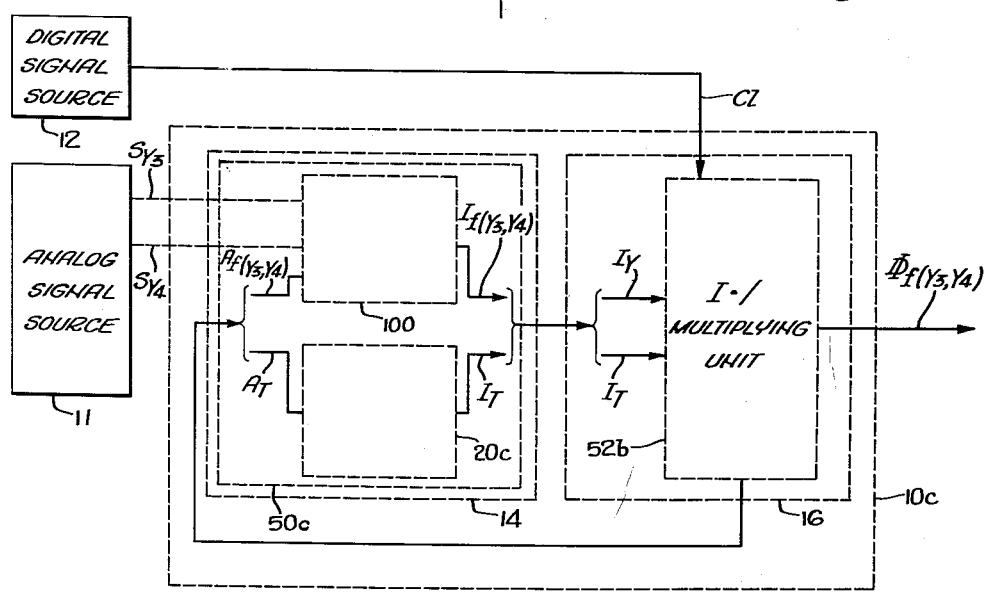
Figure 13A:
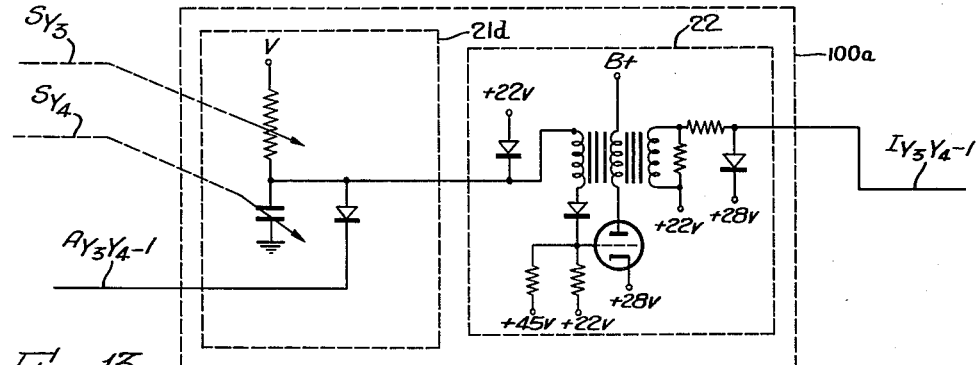
Figure 13B:
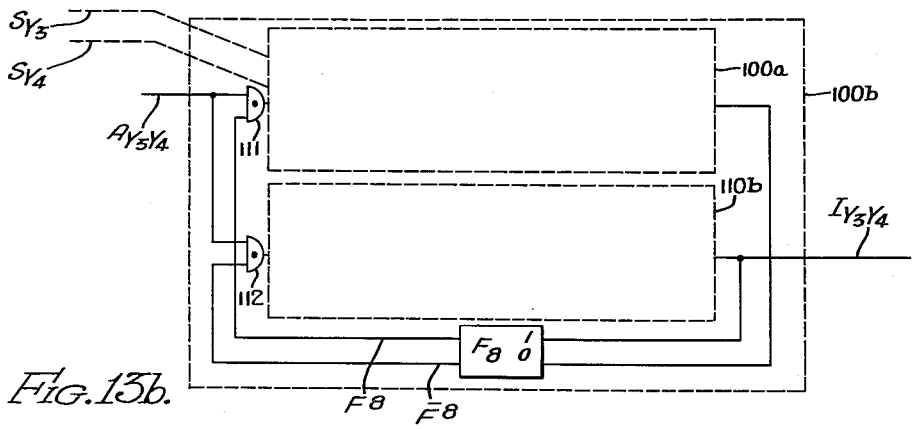
Figure 13C:
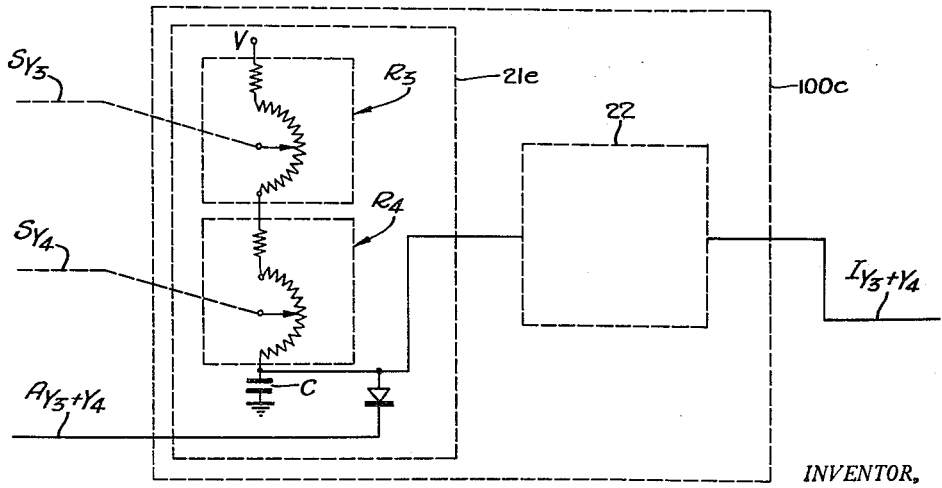

FIGS. 6a, 6b and 6d through 6k are voltage waveforms illustrating the appearance of certain electrical signals produced during the operation of the multiplying system shown in FIG. 5 while FIG. 6c is a composite time interval chart illustrating ordered time intervals arranged in ordered sequence according to a systematic scheme of computation associated with the operations of the hereinbefore mentioned multiplying system;

FIG. 7 is a complete circuit diagram of a preferred embodiment of the multiplying system shown in FIG. 5;

FIG. 8 is a circuit diagram illustrating one form of electronic flip-flop unit which may be utilized in the mechanization of electrical circuits embodied in the present invention;

FIG. 9 is a block diagram of an analog to difunction converting system according to the present invention;

FIG. 10 is a circuit diagram of a preferred embodiment of a multiplying unit utilized in the converting system of FIG. 9;

FIGS. 11a and 11c through 11h are diagrams illustrating voltage waveforms of a number of electrical signals produced during the operations of the converting system shown in FIG. 9 while FIG. 11b is a composite time interval chart illustrating the arrangement of ordered time intervals produced during the operations of the above-mentioned converting system;

FIG. 12 is a generic embodiment of a computing system according to the invention which is responsive to a pair of analog signals for producing a difunction signal train representative of a predetermined mathematical function of quantities represented by the analog signals;

FIGS. 13a, 13b and 13c illustrate three embodiments respectively of an interval generating circuit which may be utilized in the computing system shown in FIG. 12, each embodiment functioning to adapt the computing system for the production of a result representing a particular associated mathematical function of the input quantities supplied to the computing system; and FIG. 14 is a circuit diagram of a complex computing system according to the invention which embodies therein a number of computing elements previously described in connection with FIGS. 1 through 13.

Referring now to the drawings there is shown in FIG. 1 a generic block diagram of an electrical computing system 10 which is utilized for operating upon analog signals, representative of corresponding input quantities, supplied by an analog signal source 11 to produce a bilevel electrical output signal train representative of a predetermined mathematical function of said input quantities. In preferred embodiments of the invention to be described hereinbelow the output signal train produced by computing system 10 is synchronized with respect to electrical timing signals applied to system 10 by a digital signal source 12.

In certain embodiments of the invention, digital signal source 12 not only applies electrical timing signals to computing system 10, but may also apply to system 10 digital electrical input signals representing additional input quantities, each additional input quantity being represented by a corresponding bilevel electrical signal train. In these embodiments of the invention, computing system 10 is responsive to both the analog input signals supplied by source 11 and the digital input signals supplied by source 12 for producing an output signal train which is representative of a predetermined mathematical function of the input quantities represented by the analog signals and the additional input quantities represented by the digital input signals.

As shown in FIG. 1 computing system 10 comprises an interval signal generating apparatus 14 to which the analog signals produced by source 11 are applied, and a computing apparatus 16 to which timing signals and digital input signals produced by source 12 are applied.

Interval signal generating apparatus 14 is selectively actuable for producing electrical interval signals which define or demark respectively associated time intervals proportional to predetermined functions of the input quantities represented by the applied analog input signals, each selected interval signal being produced at the associated time interval after actuation of generating apparatus 14. Apparatus 14 is actuated for the production of selected interval signals only when certain associated predetermined electrical actuating signals are applied thereto.

Thus in operation interval signal generating apparatus 14 may be described as an analog-to-time interval translating device which converts analog input signals representing certain input quantities into electrically marked time intervals which represent predetermined mathematical functions of the same input quantities. The electrically marked time intervals thus generated may represent either partial or final result quantities in the course of a mathematical computation performed upon the input quantities. In operation the electrically marked time intervals which represent these result quantities are produced for utilization by computing apparatus 16 only when they are called for or ordered by application of corresponding actuating signals to generating apparatus 14.

As indicated in FIG. 1, the interval signals produced by generating apparatus 14 in response to actuation thereof are applied to computing apparatus 16 which is in turn responsive to the interval signals for producing the bilevel output signal train. In effect computing apparatus 16 receives from generating apparatus 14 either partial or final result quantities in time interval form and combines these result quantities to produce a final mathematical result in the form of the bilevel electrical output signal train. As stated hereinbefore, in preferred embodiments of the invention, the output signal train produced by computing apparatus 16 is synchronized with respect to electrical timing signals which may be applied to computing apparatus 16 by digital signal source 12.

In those embodiments of the invention, mentioned hereinbefore, in which source 12 may produce one or more bilevel electrical signal trains representing additional input quantities, computing apparatus 16 functions to combine partial result quantities received in time interval form from apparatus 14 with additional input quantities received in bilevel signal train form from source 12 to produce a final mathematical result in the form of the bilevel electrical output signal.

In preferred embodiments of computing system 10, as indicated in FIG. 1, computing apparatus 16 not only produces the bilevel electrical output signal but also produces the electrical actuating signals and applies these actuating signals to generating apparatus 14 to cause generating apparatus 14 to produce corresponding time interval signals, which in turn, are applied to computing apparatus 16 for utilization in producing the bilevel output signal and further actuating signals. With such an arrangement computing apparatus 16 forces interval signal generating apparatus 14 to produce its electrically marked time intervals in ordered sequence in accordance with a systematic scheme of computation in which the ordering or sequencing of the time intervals as well as their magnitudes plays an important part in the production of the bilevel output signal train.

The bilevel output signal train produced by computing apparatus 16 will, in preferred embodiments of computing system 10 be in the form of an electrical "difunction" signal train and will represent a final mathematical result quantity in the manner characteristic of such "difunction" signal trains. Moreover, in preferred embodiments of the invention bilevel signal trains produced by digital signal source 12 for the representation of additional input quantities will also be "difunction" signal trains.

Although "difunction" signal trains and the manner in which they can be utilized for the representation of quantity magnitudes have been adequately described in a number of prior copending patent applications by the present inventor, it appears advisable for the purpose of facilitating understanding of specific embodiments of the present invention to provide first a brief exposition of the basic principles of difunction signal representation.

One form of "difunction" electrical signal train used for the representation of a numerical quantity can be defined as a serial signal train of periodic bilevel electrical signals, each signal of the signal train having a predetermined period or duration and either a first level representing a number $N_1$ or a second level representing a number $N_2$. Difunction signal trains may take numerous equivalent forms, the most common of which are, according to this invention, a train of unipolar pulses in which the presence or absence of a pulse in a period indicates the value of the signal, a train of bipolar electrical pulses in which the polarity of a pulse in a period indicates the value of the signal, and a train of bilevel electrical signals in which the level of a signal during a period is indicative of the value of the signal.

Referring now to FIGS. 2a and 2b, there is shown in FIG. 2a a bipolar form of a signal train $\mathcal{P}_M$ which represents a fixed quantity M, while in FIG. 2b there is shown on a common time scale a bilevel form of the signal train $\mathcal{P}_M$. For purposes of clarity and simplicity, the following discussion of difunction signal trains will be directed particularly to the bilevel form shown in FIG. 2b and only the bilevel form will be utilized in the several embodiments of the invention hereinbelow described.

Referring again therefore to FIG. 2b there is shown a portion of difunction signal train $\mathcal{P}_M$ representing the quantity M which is composed of a series of bilevel electrical signals, each signal having a predetermined duration or period T, as defined by associated timing signals Cl. Each signal has during its corresponding period either a relatively high level representing a number $N_1$ or a relatively low level representing a number $N_2$. As shown in FIG. 2b the first three signals of signal train $\mathcal{P}_M$ are $N_1$ representing signals while the fourth signal is an $N_2$ representing signal. This pattern of three $N_1$ representing signals and one $N_2$ representing signal is repeated during the fifth through eighth periods of the difunction signal train and it will be assumed that in the continuation (not shown) of signal train $\mathcal{P}_M$ this signal pattern will be repeated an indefinite number of times, the signal pattern recurring every four clock periods. In general it will be found that any difunction signal train which represents a fixed quantity will be made up of regularly recurring identical signal patterns in the described manner. The time interval over which such a recurring signal pattern extends is called a recurrence interval. For the particular difunction signal train shown in FIG. 2b a recurrence interval extends over four periods of the signal train $\mathcal{P}_M$ and therefore the recurrence interval of signal train $\mathcal{P}_M$ is equal to 4T.

Consider now the algebraic average of the numbers represented by the first four signals of signal train $\mathcal{P}_M$. As set forth above, there are three $N_1$ representing signals and one $N_2$ representing signal, and, therefore, the algebraic average of the numbers represented by these first four signals of signal train $\mathcal{P}_M$ is equal to:

$$\frac{N_1+N_1+N_1+N_2}{4}$$

or $$\frac{3N_1+1N_2}{4}$$

On the other hand, consider the algebraic average of the numbers represented by the first five signals of signal train $\mathcal{P}_M$. For this period, the algebraic average becomes equal to:

$$\frac{4N_1+1N_2}{5}$$

Similarly, the algebraic average of the numbers represented by the first six, seven and eight signals of signal train $\mathcal{P}_M$ may be seen to be, respectively:

$$\frac{5N_1+1N_2}{6}$$

$$\frac{6N_1+1N_2}{7}$$

and $$\frac{6N_1+2N_2}{8}$$

However, since the value $$\frac{6N_1+2N_2}{8}$$

can be reduced to $$\frac{3N_1+1N_2}{4}$$

it is clear that the algebraic average extending over the first eight signals is equal to the algebraic average for the first four signals. It can also be demonstrated that as larger numbers of signals, and therefore larger numbers of periods of difunction signal train $\mathcal{P}_M$, are considered, the value of the algebraic average will return periodically every four periods (the recurrence interval) to the value $$\frac{3N_1+1N_2}{4}$$

that is the value of the algebraic average of signal train $\mathcal{P}_M$ over a single recurrence interval.

It is therefore clear that the value of the algebraic average of the numbers represented by the signals of a difunction signal train $\mathcal{P}_M$ representing a fixed quantity M, when considered over a larger and larger number of periods of signal train $\mathcal{P}_M$ regularly departs from and returns to the value of the algebraic average of the signals occurring during a single recurrence interval. Moreover it is apparent that as larger and larger numbers of periods are considered, the departures of the algebraic average from this regularly recurring value will become smaller and smaller. In the limit, if a sufficiently large number of periods of signal train $\mathcal{P}_M$ are considered, the value of the algebraic average approaches a stable or constant magnitude. This stable magnitude which is equal to the value of the algebraic average over a single recurrence interval, is designated M and is the quantity which is represented by difunction signal train $\mathcal{D}_M$.

Understanding of the conclusions obtained hereinabove is much facilitated by considering a specific example in which definite values are assigned to the numbers $N_1$ and $N_2$. Let it be assumed for example, in connection with signal train $\mathcal{D}_M$ shown in FIG. 2b that:

$$N_1 = +1$$
$$N_2 = -1$$

What then is the quantity M which is represented by difunction signal train $\mathcal{D}_M$?

According to the conclusions obtained hereinabove the value of the quantity M should be equal to the value of the algebraic average extending over a recurrence interval of signal train $\mathcal{D}_M$; that is, extending over four periods of the signal train. The algebraic average of the numbers represented by the first four signals of signal train $\mathcal{D}_M$ is equal to $$\frac{1+1+1-1}{4}$$

which is equal to ½. Accordingly: M=½. Now according to the conclusions reached hereinabove if the algebraic average is extended over a sufficient number of periods of signal train $\mathcal{D}_M$ representing a fixed quantity M, then the value of the algebraic average should approach a stable magnitude which approximates the quantity M=½. That such a result is actually obtained is demonstrated by Table I in which values of the algebraic averages (abbreviated Av.) are presented for all periods up to the eighth period and for the 96th through 100th periods of signal train $\mathcal{D}_M$.

*Table I*

| Periods over which Av. is extended: | Av. |
|---|---|
| 1 | 1.00 |
| 1–2 | 1.00 |
| 1–3 | 1.00 |
| 1–4 | .50 |
| 1–5 | .60 |
| 1–6 | .67 |
| 1–7 | .72 |
| 1–8 | .50 |
| * * * * | * |
| 1–96 | .50 |
| 1–97 | .505 |
| 1–98 | .51 |
| 1–99 | .515 |
| 1–100 | .50 |

It is clear from the consideration of Table I that the value of the algebraic average returns to the value ½ = .50 every four periods of signal train $\mathcal{D}_M$. For early values of the algebraic average the intermediate departures from the value ½ are quite large. However, these departures become quite small for later values of the algebraic average so that for example for those values of the algebraic average which extend over the 97th, 98th, and 99th periods, respectively, of signal train $\mathcal{D}_M$ the magnitude of the departure from the value ½ does not exceed three parts in 100. It is clear by further extension of the algebraic average the value ½ will be approximated to any desired degree of accuracy.

In general it can be shown that any quantity M whose value lies between the predetermined value $N_1$ and the predetermined value $N_2$ can be represented by a corresponding difunction signal train in which each signal represents either the value $N_1$ or the value $N_2$. In fact formulas have been developed which define the following quantities; namely, the number of periods in a recurrence interval of such a difunction signal train, the number of $N_1$ representing signals which will appear in the recurrence interval, and the number of $N_2$ representing signals which will appear in the recurrence interval. These formulas are presented hereinbelow as Formulas 1, 2 and 3. In connection with these formulas it will be assumed that the quantity M equals c/d where c and d are integers which may have either plus or minus signs. Since any number can be represented to any desired degree of accuracy as the quotient of two integers it is clear that there is no loss of accuracy in so specifying the value of the quantity M. Now therefore:

$$E_1^M = c - N_2 d \tag{1}$$

$$E_2^M = N_1 d - c \tag{2}$$

$$E_1^M + E_2^M = (N_1 - N_2) d \tag{3}$$

where: the sum $E_1^M + E_2^M$ is equal to the number of periods in a recurrence interval of the difunction signal train $\mathcal{D}_M$ which represents the quantity M=c/d;

$E_1^M$ is the number of $N_1$ representing signals occurring during the recurrence interval; and:

$E_2^M$ is the number of $N_2$ representing signals occurring during the recurrence interval.

The correctness of the foregoing formulas can readily be verified. It will be remembered that the difunction signal train $\mathcal{D}_M$ whose recurrence interval is described by Formulas 1, 2 and 3 represents the quantity M=c/d and therefore an algebraic average (abbreviated $A_v^M$.) taken over the recurrence interval of $\mathcal{D}_M$ should be equal to c/d. Now therefore to check the correctness of these formulas the algebraic average $A_v^M$. taken over a single recurrence interval of signal train $\mathcal{D}_M$ will be calculated. The value of the algebraic average $A_v^M$. is clearly given by the following Formula 4:

$$A_v^M = \frac{E_1^M N_1 + E_2^M N_2}{E_1^M + E_2^M} \tag{4}$$

where, as stated hereinbefore: the sum $E_1^M + E_2^M$ is equal to the number of periods in the recurrence interval; and $E_1^M$ and $E_2^M$ are the numbers of $N_1$ representing signals and $N_2$ representing signals, respectively, which occur during the recurrence interval of signal train $\mathcal{D}_M$.

By substituting in Equation 4, values for $E_1^M$ and $E_2^M$ as obtained from Formulas 1 and 2 the following Formula 5 is obtained:

$$A_v^M = \frac{(c - N_2 d) N_1 + (N_1 d - c) N_2}{(N_1 - N_2) d} \tag{5}$$

Equation 5 is readily transformed to the form shown in Equation 6:

$$A_v^M = \frac{N_1 c - N_1 N_2 d + N_1 N_2 d - c N_2}{(N_1 - N_2) d} \tag{6}$$

which, in turn, may be reduced to the form shown in Equation 7:

$$A_v^M = \frac{(N_1 - N_2) c}{(N_1 - N_2) d} = c/d = M \tag{7}$$

Since the algebraic average taken over the defined recurrence interval has been proven to be equal to the required M=c/d, the correctness of Formulas 1, 2 and 3 has therefore been established.

However a short numerical example illustrating the application of Formulas 1, 2 and 3 will be of considerable assistance in facilitating understanding of these formulas. Let it be assumed for the purpose of this example that:

$$N_1 = +1$$
$$N_2 = -1$$

and that: M=c/d=+½.

What then is the recurrence interval $(E_1^M + E_2^M)$ of a difunction signal train which represents the quantity ½ and what is the number of $N_1$ representing signals $E_1^M$ and $N_2$ representing signals $E_2^M$ which will occur in the recurrence interval? According to Formula 3 for the assumed condition:

$$E_1^M + E_2^M = (N_1 - N_2)d = [1-(-1)]2 = 4 \quad (8)$$

$$E_1^M = (c - N_2 d) = 1-(-1)2 = 3 \quad (9)$$

$$E_2^M = N_1 d - c = 1 \cdot 2 - 1 = 1 \quad (10)$$

Thus it is clear in view of the results obtained above that a difunction signal train which represents a quantity ½ may have a recurrence interval which comprises four periods of the difunction signal train, there being three signals representing the number +1 and one signal representing the number −1 within the recurrence interval. Obviously this solution is correct since the algebraic average of the numbers represented by these signals would be equal to $$\frac{3(+1)+1(-1)}{4} = \frac{1}{2}$$

It should be pointed out that the difunction signal train $\mathcal{D}_M$ representing quantity M may have a number of recurrence patterns as well as recurrence intervals of a number of periods different from that defined by Formulas 1 through 3. For example, in the +1, −1 system set forth above a recurrence pattern of +1, +1, −1, +1 for a recurrence interval of four periods will also have an algebraic average equal to ½. Finally, the quantity ⅓ may be represented by a recurrence pattern of +1, +1, −1 requiring a recurrence interval of three periods, while Formulas 1 through 3 require a recurrence pattern having four +1's and two −1's. In any case, however, Formulas 1 through 3 define one recurrence interval for any quantity M and the components $E_1^M$ and $E_2^M$ required for difunction representation of quantity M in the defined interval.

It is believed that the foregoing exposition of the manner in which difunction signal trains may represent numerical quantities provides adequate preparation and background for understanding of the basic principles of difunction representation of numerical quantities as it is utilized in the present invention. Having explained how quantities may be represented in difunction form it now appears desirable before beginning a detailed description of particular embodiments of the computing system of the present invention to explain more fully how quantities may be represented in time interval form and also to describe a basic circuit which may be utilized for producing electrical signals defining quantity representing time intervals.

Time intervals representing quantity magnitudes may be electrically presented in many equivalent forms. For example, in a number of embodiments of the present invention a quantity-representing time interval may be presented as the time difference between sharp electrical pulses. In other embodiments of the invention a time interval may be represented as a continuing voltage level extending over the time interval. For purposes of clarity, in the present specification attention is specifically directed to those embodiments of the invention which employ sharp pulses for the electrical definition of quantity-representing time intervals. Employment of voltage levels follows closely by direct analogy and therefore need not be separately described.

Referring now to FIG. 3 there is shown an interval generating circuit 20 which functions to generate an interval signal I at an associated time interval x after actuation of the circuit by an actuating signal A applied thereto, the time interval x elapsing between actuation of circuit 20 and production of signal I being representative of a predetermined mathematical function of a pair of analog input signals $S_{Y_i}$ and $S_{Y_j}$ which represent corresponding input quantities $Y_i$ and $Y_j$, respectively. In connection with circuit 20 shown in FIG. 3 it will be assumed that the circuit is actuated by signal A being raised from a low level, such as +22 volts, to a high level, such as +28 volts.

Figure 4:
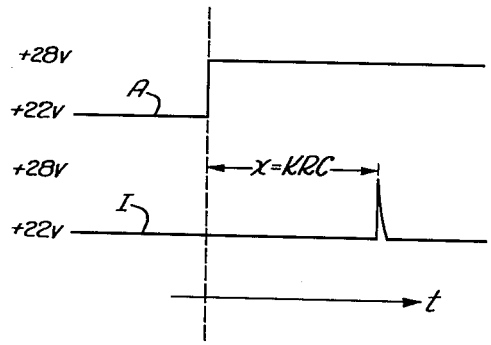
FIG. 4 is a diagram illustrating a voltage waveform of an actuating signal which may be applied to the time interval generator shown in FIG. 3 to initiate production of an ordered time interval.

In FIG. 4 there is illustrated a voltage waveform of signal A as it would appear for an actuation of interval generating circuit 20 shown in FIG. 3. The instant at which signal A rises abruptly from +22 volts to +28 volts corresponds to the instant of actuation of interval generating circuit 20. As illustrated in FIG. 4, in response to such actuation, interval generating circuit 20 produces at a time interval x after actuation a sharp electrical pulse which is the signal I and which marks the end of time interval x. It will be shown that for the particular interval signal generating circuit 20 shown in FIG. 3 the time interval x may represent a predetermined mathematical function of the quantities $Y_i$ and $Y_j$ represented by analog signals $S_{Y_i}$ and $S_{Y_j}$.

Referring again to FIG. 3 interval signal generating circuit 20 is seen to comprise two elements, namely, a charging circuit 21 which is responsive to actuating signal A and the analog signals $S_{Y_i}$ and $S_{Y_j}$ for producing a control signal Q and a pulse generating circuit 22 which is responsive to control signal Q for producing the electrical output pulse I whenever signal Q rises to a sufficiently positive voltage level. It will be shown hereinbelow that the particular embodiment of pulse generating circuit 22 shown in FIG. 3 will produce an interval signal I, or, in other words, "fire" whenever signal Q rises to a voltage level of +25 volts.

In the overall operation of charging circuit 21, signal Q is normally at a low level (+22 volts) corresponding to the normal low level of actuating signal A. When signal A (at actuation) rises abruptly to its high level (+28 volts) signal Q also rises in voltage level, but at a rate determined by the magnitudes of signals $S_{Y_i}$ and $S_{Y_j}$ in such manner that the total time elapsing between actuation and "firing" of pulse generating circuit 22 is proportional to a predetermined mathematical function of the quantities $Y_i$ and $Y_j$.

As shown in FIG. 3, within charging circuit 21, analog signal $S_{Y_i}$ controls the magnitude of a variable resistor R while signal $S_{Y_j}$ controls the magnitude of a variable capacitor C. As an example of how R and C may be controlled in this manner by the analog signals, it may be assumed that the analog signal $S_{Y_i}$ corresponds to the rotational displacement of an output shaft of an instrument which is measuring a quantity $Y_i$. The displacement $S_{Y_i}$ of the instrument output shaft may be clearly considered to be an analog signal representing the quantity $Y_i$. Control of the impedance magnitude of resistor R may therefore be readily effected merely by coupling resistor R to the instrument output shaft so that the resistor is varied in impedance in accordance with the shaft displacement. In a similar manner, capacitor C may be varied in impedance magnitude in accordance with signal $S_{Y_j}$ where $S_{Y_j}$ is another analog displacement signal.

Resistor R as shown in FIG. 3 is connected between a terminal 23 and a source of high positive potential V while capacitor C is connected between terminal 23 and a source of ground potential. A conductor 24 is connected to terminal 23 and serves as an output conductor over which the control signal Q is applied. Actuating signal A is applied to the cathode of a diode 25 whose anode is connected to conductor 24.

It is clear that in operation the voltage level of signal Q corresponds to the voltage level to which capacitor C is charged by current flowing into it from the source of potential V through resistor R. In the unactuated condition (when signal A is at +22 volts) capacitor C cannot charge to a voltage level above +22 volts, for the reason that when a voltage level of +22 volts is attained diode 25 becomes strongly conductive, directly coupling conductor 24 to the source of actuating signal A and thereby maintaining the voltage level of signal Q at the low level (+22 volts) of actuating signal A.

However, when (at actuation) signal A rises abruptly to its high level of +28 volts, capacitor C may again be charged towards a higher voltage level at a rate determined by the magnitudes of R and C and could theoretically reach a voltage level of +28 volts before diode 25 would again become conductive, and prevent further voltage rise. However as soon as a voltage level of +25 volts is attained, pulse generator 22 is fired producing an interval signal I. Thus it is clear that the time interval $x$ corresponds in duration to the time required for capacitor C to be charged from +22 to +25 volts.

Those skilled in the electrical arts will recognize that in the charging of capacitor C from the constant voltage source V through a series connected resistor R, the time $x$ required for the capacitor to charge from a first fixed potential level (+22 volts) to a second fixed potential level (+28 volts) is directly proportional to the product R.C. of the impedances R and C. This statement may be expressed in algebraic form in the following formula:

$$x = KRC \qquad (11)$$

where: K is a dimensionless constant whose magnitude is related to the fixed circuit and voltage parameters of the series charging circuit under consideration, R is the total series charging resistance of the charging circuit, and C is the total series charging capacitance of the charging circuit.

It will be shown hereinbelow that when pulse generating circuit 22 fires to produce an interval signal I, it also at the same time kicks back at charging circuit 21 by applying a large negative signal to conductor 24, having the effect it will be shown of instantaneously discharging capacitor C to its former value of +22 volts. At this time, if signal A is merely maintained at its high level (+28 volts) capacitor C will once again be charged upwards from +22 volts to +25 volts to cause pulse generating circuit 22 to be fired a second time. Thus the mere maintenance of signal A at its high level after production of an interval signal I, corresponds to another actuation of signal generating circuit 20 causing production of a second interval signal I after an interval equal to the first interval. On the other hand if signal A is returned to its low level (+22 volts) at or shortly after the time of production of the first interval signal I, then the described clamping action of diode 25 would prevent capacitor C from being charged above +22 volts and thereby prevent any further firing of pulse generating circuit 22. When signal A is again raised to its high level, interval signal generating circuit 20 will again be actuated to produce interval signal I at the time interval $x$ after actuation.

Having now described the structure and mode of operation of charging circuit 21 in some detail, consideration will now be given to the structure and manner of operation of pulse generating circuit 22 which, it will be remembered, produces interval signal I whenever the signal Q supplied by charging circuit 21 rises to a voltage level of +25 volts.

As shown in FIG. 3, pulse generating circuit 22 is essentially a regenerative amplifier including a normally non-conductive triode 26, having its plate circuit regeneratively coupled through a transformer 27 to its grid circuit. Under these conditions, whenever the grid of triode 26 becomes sufficiently positive, the triode is rapidly driven to a highly conductive state, because of positive feedback through the regenerative coupling, thereby causing production of a short electrical pulse in the amplifier output circuit.

Signal Q is applied to pulse generating circuit 22 along conductor 24 which, as shown in FIG. 3, is connected to one end of a secondary winding 28 of transformer 27, the other end of winding 28 being connected to the anode of a diode 29 whose cathode is directly connected to the grid of triode 26. A diode 30 is interconnected between conductor 24 and a source of +22 volts, diode 30 having its cathode connected to conductor 24 and its anode connected to said source of +22 volts. The grid of triode 26 is connected through a resistor 31 to the source of +22 volts and is also connected through another resistor 32 to a source of +45 volts.

Resistors 31 and 32 are selected in value so that a voltage level of +25 volts normally exists at the grid of triode 26 (and hence at the cathode of diode 29). On the other hand the cathode of triode 26 is directly connected to a source of +28 volts so that triode 26 is normally non-conductive. The plate of the triode is connected through a primary winding 33 of transformer 27 and through a resistor 34 to a source of positive plate supply potential. A secondary winding 35 of transformer 27 is coupled to primary winding 33 so that current signals introduced in winding 33 are electromagnetically induced in secondary winding 35 which functions as an output winding. A resistor 36 is shunted across winding 35, one end of resistor 36 being connected to the source of +22 volts and its other end being connected to one terminal of a resistor 37 whose opposite terminal is connected to an anode of a diode 39. The cathode of diode 39 is connected to the source of +28 volts while the anode of diode 39 is connected to an output conductor 40.

It will be remembered that the operation of pulse generating circuit 22, control signal Q is normally maintained at a voltage level of +22 volts. Since this normal voltage level of signal Q is negative with respect to the +25 voltage level existing at the cathode of diode 29, diode 29 is normally non-conductive and therefore acts as an open circuit which interrupts the regenerative feedback loop between the plate circuit of triode 26 and its grid circuit. Thus, so long as signal Q is maintained at a voltage level below +25 volts, signal regeneration will not take place. However when signal Q is raised to a voltage level slightly above +25 volts diode 29 becomes conductive thereby closing the plate to grid circuit regenerative feedback loop, whereupon pulse generating circuit 22 immediately regenerates strongly to apply a positive output pulse (signal I) to output conductor 40.

It will be recognized by those skilled in the art that, during regeneration, a large voltage signal will be induced across secondary winding 28 of transformer 27, the polarity of this voltage signal being such that a large positive signal is applied to the grid of triode 26 through diode 29, while at the same time a large negative signal is applied to conductor 24, this latter signal being the kick-back signal which tends to discharge capacitor C. Diode 30, it is clear will become conductive as soon as the negative kick-back signal drops to a voltage level of +22 volts and thereby clamps the negative excursion of the kick-back signal at +22 volts. Thus in operation the net effect of the application of the kick-back signal to conductor 24 is to discharge capacitor C from its firing level of +25 volts back to its normal level or starting level of +22 volts, as hereinbefore stated.

Accordingly, as described hereinabove, if signal A remains at its high level (+28 volts) after circuit 22 has been fired capacitor C will be again charged upwards from its starting value (+22 volts) to the firing level (+25 volts) so as to again fire pulse generating circuit 22. On the other hand if signal A is returned to its low level (+22 volts) at this time, then capacitor C cannot be recharged until signal A is again raised to its high level.

In the overall operation of interval signal generating circuit 20, as described hereinbefore, the time interval $x$ elapsing between actuation of circuit 20 by signal A and the production of a corresponding interval signal I is related to the magnitudes of the impedances R and C by the above-developed formula:

$$x = KRC \qquad (11)$$

It can be shown that the electrically defined time interval $x$ may be made to represent predetermined mathematical functions of the quantities $Y_i$ and $Y_j$, represented by analog signals $S_{Y_i}$ and $S_{Y_j}$, respectively. It will be assumed in this connection that the analog signals $S_{Y_i}$ and $S_{Y_j}$ are directly proportional to the quantities $Y_i$ and $Y_j$ which they represent.

If, as an example, C is maintained constant and R is varied in direct proportion to the magnitude of analog signal $S_{Y_i}$, then from a consideration of Formula 4 it is clear that the duration of the time interval $x$ will be directly proportional to the magnitude of analog signal $S_{Y_i}$ and therefore proportional to the quantity $Y_i$. As another example, if R and C are varied directly with $S_{Y_i}$ and $S_{Y_j}$, respectively, then it is clear that the time interval $x$ will be proportional to the product of $Y_i$ and $Y_j$, thereby representing this product in time interval form. As still a further example assume that C is maintained constant and that resistor R is supplied as two series connected resistors which are varied linearly with signals $S_{Y_i}$ and $S_{Y_j}$, respectively. It is then clear that the time interval $x$ will be proportional to the sum of $Y_i$ and $Y_j$. Moreover, the examples supplied hereinabove by no means exhaust the possible mathematical functions of the quantities $Y_i$ and $Y_j$ which may be represented by the time interval $x$. For example, by using parallel connected resistors controlled by signals $S_{Y_i}$ and $S_{Y_j}$, respectively, the mathematical function $$\frac{Y_i \cdot Y_j}{Y_i + Y_j}$$

may readily be produced in corresponding time interval form. Through utilization of non-linear potentiometers and capacitors, the time interval $x$ may be made to represent almost any conceivable function of the analog input signals. For example if C is a non-linear capacitor which is varied inversely with $S_{Y_j}$ while R is varied directly with $S_{Y_i}$, then the resultant time interval $x$ will be proportional to the quotient $$\frac{Y_i}{Y_j}$$

Those skilled in the art will readily perceive how non-linear resistors and capacitors may be utilized in other ways for the production of time intervals which represent other mathematical functions of the analog input signals. Moreover it will be clear to those skilled in the art that any number of analog input signals may be utilized for the control of interval generating circuit 20. For example, if five analog input signals are applied and resistor R is supplied as five series connected resistors which are individually varied by the analog signals then it is clear that the time interval $x$ will represent the sum of the five interval signals. Many other mathematical functions may be mechanized in a similar manner.

It is believed that the foregoing description provides sufficient information regarding the nature of electrically defined time intervals and the manner of their formation so that a particular embodiment of the present invention may now be considered. One of the most useful and interesting embodiments of computing system 10 of the present invention is an embodiment which functions essentially as a multiplier by producing an output difunction signal train which represents the product of two quantities respectively represented by an analog input signal and an input difunction signal train. Such an embodiment of computing system 10 of the present invention is shown in block diagram form in FIG. 5 and is there designated 10a. Embodiment 10a of computing system 10 will be referred to hereinafter as multiplying system 10a.

Referring therefore to FIG. 5 it is seen that multiplying system 10a is adapted for operating upon an analog signal $S_Y$ supplied by signal source 11 and a difunction signal train $\mathcal{D}_M$ supplied by digital signal source 12 to produce an electrical difunction signal train $\mathcal{D}_{Y.M}$ which represents the product of the quantities Y and M represented by the analog input signal $S_Y$ and input signal train $\mathcal{D}_M$, respectively. In the preferred mode of operation of the system shown in FIG. 5 the output signal train $\mathcal{D}_{Y.M}$ will continuously represent the product of the quantities Y and M. The process of multiplication which is utilized is effective both with varying input quantities and with constant or stationary input quantities. However, to facilitate understanding of the invention it will be assumed in the description which will be supplied hereinbelow that quantities Y and M have stationary values and that therefore the product $Y.M$ will have a constant value or magnitude which will be represented by output signal train $\mathcal{D}_{Y.M}$ in the manner hereinbefore described.

Thus for example if signal train $\mathcal{D}_{Y.M}$ is considered to be a periodic signal train having the same period T as signal train YM and composed of successive bivalued electrical signals which represent either the predetermined number $N_1$ or the predetermined number $N_2$, then the algebraic average of the numbers $N_1$ and $N_2$ represented by the signals of signal train $\mathcal{D}_{Y.M}$ will approach a stationary value equal to $Y.M$ when the algebraic average is extended over a sufficiently large number of periods of the signal train. Moreover the value of an algebraic average extended over a single recurrence interval of signal train $\mathcal{D}_{Y.M}$ will also be equal to the fixed magnitude of the product $Y.M$.

Referring again to FIG. 5, interval signal generating apparatus 14 is seen to include a signal generating unit 50, to which the analog signal $S_Y$ is applied and which is selectively actuable for producing interval signals $I_Y$, $I_{Y'}$, and $I_T$ at corresponding time intervals $x_Y$, $x_{Y'}$, and $x_T$ after actuation thereof: where time intervals $x_Y$ and $x_{Y'}$ are both proportional in duration to the input quantity Y which is represented by analog signal $S_Y$ and time interval $x_T$ is equal in duration to the period T of each signal of difunction signal trains $\mathcal{D}_M$ and $\mathcal{D}_{Y.M}$. The multiplication process which is accomplished by computing system 10a shown in FIG. 5, is facilitated if time intervals $x_Y$ and $x_{Y'}$ are related to the value of quantity Y in a particular manner described by the following formulas:

$$x_Y = (N_1 Y - N_2)\left(\frac{T}{N_1 - N_2}\right) \quad (12)$$

$$x_{Y'} = (N_2 Y - N_2)\left(\frac{T}{N_1 - N_2}\right) \quad (13)$$

Thus for purposes of multiplication, time intervals $x_Y$ and $x_{Y'}$ as indicated by Equations 12 and 13 above, have durations proportional to $N_1.Y$ and $N_2.Y$, respectively, where $N_1$ and $N_2$ are the predetermined numbers represented by the signals of signal train $\mathcal{D}_M$.

As shown in FIG. 5 interval signals $I_Y$, $I_{Y'}$, and $I_T$ which electrically define time intervals $x_Y$, $x_{Y'}$, and $x_T$ are applied to an $I.\mathcal{D}$ multiplying unit 52 which is included within computing apparatus 16. Difunction input signal train $\mathcal{D}_M$ and a corresponding electrical synchronizing signal C1 are applied to multiplying unit 52 by digital signal source 12. In overall operation multiplying unit 52 is responsive to the electrical signals applied thereto for producing successive signals of signal train $\mathcal{D}_{Y.M}$ and also for producing and applying actuating signals to signal generating unit 50 in ordered sequence in accordance with a systematic scheme of computation. In operation signal generating unit 50 produces, in response to these actuating signals ordered sequences of electrically defined time intervals which are utilized in turn by multiplying unit 52 for the formation of output signal train $\mathcal{D}_{Y.M}$ and for the production of further actuating signals.

As has been stated hereinbefore the overall operation of multiplying system 10a shown in FIG. 5a proceeds in accordance with a systematic scheme of computation in which the sequencing or ordering of time intervals $x_Y$, $x_{Y'}$, and $x_T$ is significant as well as the magnitude of these time intervals. Before beginning a detailed description of specific circuit structure which may be utilized in mechanizing multiplier 10a it appears desirable to first explain and clarify the rules which govern the aforementioned systematic scheme of computation and to provide a specific example which illustrates how the time intervals $x_Y$, $x_Y'$, and $x_T$ may be arranged in ordered sequence according to these rules so as to furnish indications which determine the successive values of the bivalued electrical signals of output signal train $\mathcal{P}_{Y.M}$.

In the example which has been chosen for illustrative purposes it has been assumed that input difunction signal train $\mathcal{P}_M$ which is applied to multiplying unit 52 represents the number ½ in the +1, −1 class of difunction representation (that class in which $N_1=+1$ and $N_2=-1$). It is further assumed that the number Y which is represented by analog signal $S_Y$ is equal to −½ and that therefore in accordance with Formulas 12 and 13:

$$x_Y = (N_1 Y - N_2) \cdot \frac{T}{N_1 - N_2}$$
$$= \left[1 \cdot \left(\frac{1}{2}\right) - (-1)\right] \cdot \frac{T}{+1-(-1)} = \frac{1}{4}T \quad (14)$$

$$x_Y' = (N_2 Y - N_2) \cdot \frac{T}{N_1 - N_2}$$
$$= \left[(-1) \cdot \left(-\frac{1}{2}\right) - (-1)\right] \cdot \frac{T}{1-(-1)} = \frac{3}{4}T \quad (15)$$

and:
$$x_T = T \quad (16)$$

It will be remembered, that T is the duration of a period of the input difunction signal train $\mathcal{P}_M$.

Since in this example $\mathcal{P}_M$ represents the number ½ and $S_Y$ represents the number −½, then it is clear that the output difunction signal train $\mathcal{P}_{M.Y}$ is intended to represent the product (½.−½) which is equal to −¼.

Referring now to FIGS. 6a through 6d, there are shown in FIGS. 6a, 6b and 6d, waveforms which illustrate the appearance of synchronizing signal Cl and signal trains $\mathcal{P}_M$ and $\mathcal{P}_{YM}$ respectively as they would appear during the course of operation of multiplying system 10a. In FIG. 6c there is shown a composite time interval chart which illustrates time intervals $x_Y$, $x_Y'$, and $x_T$ arranged in an ordered sequence according to the hereinabove mentioned systematic scheme of computation so as to furnish indications which directly determine the values of successive bivalued signals of signal train $\mathcal{P}_{Y.M}$ shown in FIG. 6d. For the moment the time intervals $x_Y$, $x_Y'$, and $x_T$ will be spoken of in a somewhat abstract manner without reference to the electrical signals which define the time intervals. At a later point in the present specification the time intervals which are shown in an abstract manner in FIG. 6 will be related to the electrical interval signals which define the time intervals and will also be related to the specific circuitry which produces the electrical interval signals in the required sequence.

The following rules govern the sequencing of time intervals $x_Y$, $x_Y'$, and $x_T$ as this sequencing is illustrated in FIG. 6c:

*Rule 1.*—During each period of signal train $\mathcal{P}_M$ in which the corresponding signal of train $\mathcal{P}_M$ is at its high level representing the number $N_1$ ($N_1=+1$ in the present example) a single time interval $x_Y$ is initiated, while during each period of signal train $\mathcal{P}_M$ in which the corresponding signal is at its low level representing the number $N_2$ (−1 in this example) a single time interval $x_Y'$ is initiated.

*Rule 2.*—If a time interval $x_Y$ or $x_Y'$ is completed during the same period in which it was initiated a time interval $x_T$ is initiated. However, if time interval $x_Y$ or $x_Y'$ is not completed until the period following that in which it was initiated another time interval $x_Y$ or $x_Y'$ is initiated in accordance with Rule 1.

*Rule 3.*—Upon completion of a time interval $x_T$ either a time interval $x_Y$ or a time interval $x_Y'$ is initiated in accordance with Rule 1.

It is instructive to follow the sequence of time intervals shown in FIG. 6c so as to demonstrate that this sequence does indeed agree with Rules 1 through 3 supplied hereinabove. In FIG. 6b nine signals of difunction signal train $\mathcal{P}_M$ are shown. These signals will be referred to as signals 1 through 9 in accordance with the correspondingly numbered periods of signal train $\mathcal{P}_M$. During period 1, signal 1 of signal train $\mathcal{P}_M$ is at its high level representing the number $N_1$ and therefore as shown in FIG. 6c a time interval $x_Y$ was initiated during period 1 in accordance with Rule 1. This first time interval $x_Y$ was completed during the same period in which it was initiated and therefore a time interval $x_T$ was immediately initiated during period 1 in accordance with Rule 2. Upon the completion of time interval $x_T$ in period 2 another time interval $x_Y$ was initiated in accordance with Rules 3 and 1, the time interval $x_Y$ being initiated during period 2 rather than the time interval $x_Y'$ because signal 2 of signal train $\mathcal{P}_M$ is at its high level. Again during period 2, the time interval $x_Y$ is completed within the same period in which it was initiated and a second time interval $x_T$ is therefore initiated which is not completed until period 3; whereupon another time interval $x_Y$ is promptly initiated during period 3 in accordance with Rules 3 and 1.

Once again therefore at the completion of time interval $x_Y$ in period 3 a time interval $x_T$ is initiated which is not completed until period 4. Then, since during period 4 signal 4 of signal train $\mathcal{P}_M$ is at its low level representing the number $N_2$ time interval $x_Y'$ is promptly initiated during period four in accordance with Rules 3 and 1. Further detailed consideration of the sequence of time intervals shown in FIG. 6c is not required since it is now evident that the time intervals shown in FIG. 6c are sequenced in strict accordance with Rules 1, 2 and 3.

It will be remembered, however, that the purpose for which time intervals $x_Y$, $x_Y'$, and $x_T$ were sequenced in accordance with Rules 1 through 3 was to furnish indications as to the successive values of the signals of output difunction signal train $\mathcal{P}_{YM}$. These successive values of the signals of output difunction signal train $\mathcal{P}_{YM}$ may be determined from the ordered time intervals by application of the following Rule 4:

*Rule 4.*—If a time interval $x_Y$ or $x_Y'$ is completed during the same period in which it was initiated then during the following period the corresponding signal of signal train $\mathcal{P}_{YM}$ will be at its low level representing the number $N_2$ ($N_2$ being equal to −1 in the present example). However, if a time interval $x_Y$ or $x_Y'$ is not completed during the same period in which it was initiated, then during the following period the corresponding signal of signal train $\mathcal{P}_{YM}$ will be at its high level representing the number $N_1$ ($N_1$ being equal to +1 in the present example).

A brief examination of FIGS. 6c and 6d will illustrate the application of Rule 4. For example, during period 1, the time interval $x_Y$ was both initiated and completed and therefore during the following period 2, signal 2 of output difunction signal train $\mathcal{P}_{YM}$ is at its low level. Similarly during periods 2, 3, 5, and 7, time intervals $x_Y$ or $x_Y'$ were completed during the periods within which they were initiated and therefore during the following periods 3, 4, 6, and 8 the corresponding signals of signal train $\mathcal{P}_{YM}$ are at their low levels. On the other hand, during periods 4, 6 and 8 time intervals $x_Y$ or $x_Y'$ were not completed until the periods following their initiation periods and therefore during these following periods, periods 5, 7 and 9, the corresponding signals of signal train $\mathcal{P}_{YM}$ were at their high levels.

According to the general theory presented hereinabove, output signal train $\mathcal{P}_{YM}$ illustrated in FIG. 6d and determined in the described manner from the ordered time intervals shown in FIG. 6c represents the product $$Y.M = -\tfrac{1}{4}$$

That the signal train $\mathcal{P}_{YM}$ shown in FIG. 6d does indeed represent the number $Y.M=-\tfrac{1}{4}$ can readily be verified. It will be remembered that the value represented by a difunction signal train may be found by extending an algebraic average over a single recurrence interval of the difunction signal train.

From a consideration of the composite time interval shown in FIG. 6c and of signal train $\mathcal{D}_{YM}$ shown in FIG. 6d it can be demonstrated that periods 2 through 9 of signal train $\mathcal{D}_{YM}$, together comprise a recurrence interval of the signal train. It will be noted in this connection that the section of the composite time interval which is included within period 9 identical to that section of the composite time interval which is included within period 1, the latter section also bearing the same relationship to signal 9 of signal train $\mathcal{D}_M$ that the former section bears to signal 1 of signal train $\mathcal{D}_M$. It is therefore evident that the pattern of time intervals shown in FIG. 6c will be regularly repeated every 8 periods. Since the signals of output difunction signal train $\mathcal{D}_{YM}$ are determined in value by the ordered time intervals, it therefore follows that the pattern of bivalued signals of signal train $\mathcal{D}_{YM}$ will be similarly repetitive every 8 periods, 8 periods therefore being a recurrence interval of signal train $\mathcal{D}_{YM}$. Signal may therefore be considered to be the last signal of one recurrence interval while signals 2 through 9 may be considered to be included within a successive recurrence interval.

Examining the 8 signals of this recurrence interval it is seen that there are 3 high level signals representing the number $+1$ and 5 low level signals representing the number $-1$. An algebraic average extending over this recurrence interval of signal train $\mathcal{D}_{YM}$ shown in FIG. 6d may therefore be calculated from Formula 4 developed hereinabove $$A_V{}^{YM} = \frac{E_1{}^{YM}N_1 + E_2{}^{YM}N_2}{E_1{}^{YM} + E_2{}^{YM}}$$

$$= \frac{3(+1) + 5(-1)}{5+3} = \frac{3-5}{8} = -\frac{1}{4} \quad (17)$$

It has therefore been demonstrated that signal train $\mathcal{D}_{YM}$, determined from an ordered sequence of time intervals $x_Y$, $x_Y'$ and $x_T$ in the described manner, does indeed represent the product ($-\frac{1}{4}$) of the numbers $M = \frac{1}{2}$ represented in difunction form by signal train $\mathcal{D}_M$ and $Y = -\frac{1}{2}$ represented in time interval form by time intervals $x_Y$ and $x_Y'$.

It is intended next to specifically relate the time intervals $x_Y$, $x_Y'$, and $x_T$, shown in abstract fashion in FIG. 6c, to the electrical interval signals $I_Y$, $I_Y'$, and $I_T$ which electrically demark these time intervals and to present specific circuitry for the production of these electrical interval signals. It will be remembered, referring once again to FIG. 5, that interval signals $I_Y$, $I_Y'$, and $I_T$ are selectively produced by signal generating unit 50 in response to application of corresponding actuating signals thereto by multiplying unit 52, the interval signals $I_Y$, $I_Y'$, and $I_T$ being generated at the corresponding associated time intervals $x_Y$, $x_Y'$, and $x_T$ after actuation of unit 50.

Attention is therefore directed to FIG. 7 wherein there is shown a complete circuit diagram of a preferred embodiment of multiplying system 10a, including structural details of preferred embodiments of signal generating unit 50 and multiplying unit 52. In accordance with the above described objectives, attention is particularly directed to the structure of signal generating unit 50 as it is shown in FIG. 7. Generating unit 50 is seen to comprise three interval signal generating circuits 20a, 20b and 20c, respectively, which are generally similar to interval generating circuit described hereinabove in connection with FIGS. 3 and 4.

As indicated in FIG. 7 three actuating signals $A_Y$, $A_Y'$, and $A_T$ are produced by multiplying unit 52 and selectively applied to interval signal generating circuits 20a, 20b and 20c to cause these circuits to produce the corresponding time interval signals $I_Y$, $I_Y'$, and $I_T$ at time intervals $x_Y$, $x_Y'$ and $x_T$, respectively, after actuation.

It will be understood for example that generating circuit 20a is actuated for the production of interval signal $I_Y$ only when actuating signal A rises to its high level, the time interval $x_Y$ elapsing between the actuation of circuit 20 and production of interval signal $I_Y$. As shown in FIG. 7 generating circuit 20a includes a charging circuit 21a in which the total series charging resistance (hereinbefore designated R) comprises a fixed resistor $R_c$ connected in series with a potentiometer 60a whose wiper arm 61a is positioned under the control of analog signal $S_Y$ and is electrically connected to one terminal of capacitor C. In this manner a variable resistance portion designated $R_v$, of potentiometer 60a is connected in series with fixed resistor $R_c$ and capacitor C and is varied in magnitude in direct proportion to the magnitude of signal $S_Y$.

Time interval $x_Y$ elapsing between actuation of circuit 20a and production of interval signal $I_Y$, it is clear, will be proportional to the magnitude of resistor $R_v$ and therefore proportional to the quantity Y represented by analog signal $S_Y$. It will be remembered however that it is desired that the time interval $x_Y$ have a magnitude defined by Formula 12 supplied hereinabove.

$$x_Y = (N_1 Y - N_2) \frac{T}{N_1 - N_2} \quad (12)$$

The desired relationship between time interval $x_Y$ and quantity Y as defined by Equation 12 above can ordinarily be obtained through suitable selection of resistance values for $R_c$ and $R_v$ and by appropriate setting of a zero or neutral position for wiper arm 61a of potentiometer 60a. The manner in which such a relationship may be established is best illustrated by a brief numerical example. Let it be assumed in connection with the following example that:

$$N_1 = +1, \ N_2 = -1$$

and that therefore in accordance with Equation 12, for the present example:

$$x_Y = (Y+1) \frac{T}{2} \quad (18)$$

Let it be assumed further that wiper arm 61a of potentiometer 60a is adjusted in such a manner that when signal $S_Y$ represents the quantity $Y = 0$ wiper arm 61a will be positioned at a midpoint 63a on potentiometer 60a at which:

$$R_V = \frac{R_{V(max)}}{2} \quad (19)$$

where: $R_{V(max)}$ is the maximum value of resistance $R_V$ and corresponds to maximum clockwise rotation of wiper arm 61a under the control of signal $S_Y$.

It will also be assumed that clockwise displacement of wiper arm 61a with respect to point 63a is intended to correspond to increase of the quantity Y above zero, while counterclockwise displacement of wiper arm 61a with respect to point 63a is intended to correspond to decrease of the quantity Y below zero. Finally as stated hereinbefore when quantity Y is equal to zero, wiper arm 61a will be at point 63a.

According to Equation 18 therefore, when wiper arm 61a is at point 63a (when $Y = 0$), the time interval $x_Y$ is required to have the following duration:

$$x_Y = (1+Y) \frac{T}{2} = (1+0) \frac{T}{2} = \frac{T}{2} \quad (20)$$

From the fact that time interval $x_Y$ is required to equal $$\frac{T}{2}$$

when wiper 61a is at point 63a it is possible through application of Formula 11 to calculate suitable values for the resistances $R_C$ and $R_{V (max)}$. According to Formula 11:

$$x_Y = kRC \quad (11)$$

where:
R is the total series charging resistance, and
C is the total series charging capacitance Since, for circuit 20a, the total charging resistance R is equal to $R_C + R_V$, it is clear that when $$R_V = \frac{R_{V(max)}}{2}$$

Formula 11 may be rewritten in the form:

$$x_Y = kC\left[R_C + \frac{R_{V(max)}}{2}\right] \quad (21)$$

and therefore, combining Formulas 20 and 21:

$$kC\left(R_C + \frac{R_{V(max)}}{2}\right) = \frac{T}{2} \quad (22)$$

Solving for the resistor values:

$$R_C + \frac{R_{V(max)}}{2} = \frac{T}{2kC} \quad (23)$$

In general, any values for $R_C$ and $R_{V (max)}$ which satisfy Equation 23 above will be useful solutions of the present example. It will be understood however that it is advisable to select a value for $R_C$ which is relatively low with respect to the value of $R_{V (max)}$ so that it will be possible to have a large range of resistance variation (and time interval variation) for the representation of the quantity Y.

For example the values $$R_C = \frac{.1T}{KC} \text{ and } R_{V(max)} = \frac{.8T}{KC}$$

satisfy Formula 23 above and in addition satisfy the desired condition that $R_C$ be small with respect to $R_{V (max)}$. With these resistance values, at full clockwise rotation of wiper 61a the time interval $x_Y$ will have a duration of .9T representing the quantity $Y = +.8$, while at full counterclockwise rotation of wiper 61a, the time interval $x_Y$ will have a duration of .1T representing the quantity $Y = -.8$. Thus with these resistance values for $R_C$ and $R_{V (max)}$ and with the neutral or zero position of wiper 61a at midpoint 63a of potentiometer 60a, the electrically defined time interval $x_Y$ will represent all values of the quantity Y between +.8 and −.8, thereby establishing an adequate range of representation of the quantity Y.

In the foregoing description the manner in which suitable resistor values may be selected for the mechanization of charging circuit 21a of generating circuit 20a has been established. In addition it has been made clear in what manner generating circuit 20a may be controlled by analog signal $S_Y$ for the production of interval signal $I_Y$ at the time interval $$x_Y = (N_1 Y - N_2) \frac{T}{N_1 - N_2}$$

after actuation of generating circuit 20a by actuating signal $A_Y$ being raised to its high level.

Generating circuit 20b, as shown in FIG. 7, is very similar to generating circuit 20a and may be similarly mechanized for the electrical definition of the time interval $$x_Y' = (N_2 Y - N_2) \frac{T}{N_1 - N_2}$$

For example in the +1, −1 class of difunction representation ($N_1 = +1$, $N_2 = -1$), time interval $x_Y'$ is defined by the following Formula 24:

$$x_Y' = (1 - Y) \frac{T}{2} \quad (24)$$

It will be noted from a consideration of Formulas 18 and 24 that in the +1, −1 class of difunction representation the time intervals $x_Y$ and $x_Y'$ are complementary in the sense that the sum of the two time intervals is always equal to T. The manner in which such a complementary relationship may be established between the two time intervals is illustrated by the construction of a charging circuit 21b of generating circuit 20b shown in FIG. 7. As shown in FIG. 7 charging circuit 21b is almost identical to charging circuit 21a and includes another fixed resistor $R_C$ connected in series with a potentiometer 60b which is identical to potentiometer 60a, so that both wiper arms move together with the same sense of rotation under the control analog signal $S_Y$. However, within charging circuit 21b, fixed resistor $R_C$ is connected to a different terminal of potentiometer 60b so that clockwise rotation in the wiper arms which causes an increase in total charging resistance in charging circuit 21a causes a corresponding decrease in charging circuit 21b.

Moreover, wiper arm 61b is adjusted so that when wiper arm 61a is at midpoint 63a of potentiometer 60a $$\left(\text{corresponding to } Y = 0, x_Y = \frac{T}{2}\right)$$

wiper arm 61b will be positioned at a corresponding midpoint 63b of potentiometer 60b. Accordingly, when $Y = 0$ the total charging resistance of circuits 20a and 20b are identical, so that time interval $$x_Y = x_Y' = \frac{T}{2}$$

the sum of the two time intervals therefore being equal to T when $Y = 0$. Thereafter any increase in the quantity Y (represented by clockwise rotation of wiper arms 61a and 61b) will cause an increase in charging resistance in circuit 21a and a corresponding decrease in charging resistance in circuit 21b so that in operation time interval $x_Y'$ will remain complementary to $x_Y$ in the required manner.

Referring now to interval signal generating circuit 20c which, it will be remembered, produces signal $I_T$ at a time interval $x_T = T$ after actuation of generating circuit 20c by actuating signal $A_T$, it is seen that circuit 20c includes a charging circuit 21c in which a single fixed resistor $R_T$ is interconnected between the source of positive voltage and condenser C. The value of resistor $R_T$ is selected so that time interval $x_T$ has the required value ($x_T = T$). The magnitude of resistor $R_T$ may be expressed by the following Formula 25:

$$R_T = \frac{T}{kC} \quad (25)$$

In the immediately foregoing description of the construction and operation of interval signal generating circuits 20a, 20b and 20c which together comprise generating unit 50 shown in FIG. 7 have been described in some detail. Particular attention has been devoted to the mechanization of these circuits for the +1, −1 class of difunction representation as illustrated by the several examples supplied hereinabove. However, in view of the foregoing description it is clear that through appropriate variation of charging circuits 21a, 21b and 21c, the corresponding generating circuits 20a, 20b and 20c may be mechanized for any system of difunction representation. Such mechanization will ordinarily involve only a proper selection of resistor and capacitor values and an appropriate choice of zero or neutral positions for the wiper arms of potentiometers which are utilized in the circuits.

Having completed the description of the detailed structure of generating unit 50 shown in FIG. 7 attention is now directed to the structure of multiplying unit 52 as shown in FIG. 7. As explained hereinbefore and indicated in FIG. 7, the actuating signals $A_Y$, $A_Y'$, and $A_T$ are produced by multiplying unit 52 and applied to generating unit 50 in such manner as to cause generating unit 50 to produce electrically defined time intervals $x_Y$, $x_Y'$, and $x_T$ (defined by signals $I_Y$, $I_Y'$, and $I_T$) in order sequence in accordance with the systematic scheme of computation described by Rules 1, 2 and 3. Moreover, as computation proceeds, multiplying unit 52 produces successive signals of output signal train $\wp_{Y \cdot M}$ in accordance with Rule 4, hereinbefore described. As shown in FIG. 7, in the formation of signals $A_Y$, $A_Y'$, and $A_T$ and the successive signals of signal train $\wp_{Y \cdot M}$, multiplying unit 52 utilizes interval signals $I_Y$, $I_{Y'}$, and $I_T$ which are applied thereto be generating unit 50 and also utilizes timing signal $Cl$ and the signals of signal train $\wp_M$ which are applied thereto by digital signal source 12.

Referring now to the detailed structure of multiplying unit 52, as shown in FIG. 7, multiplying unit 52 is seen to include four bistable elements, such as electronic flip-flop units $F_1$, $F_2$, $F_3$ and $F_4$ an inverting amplifier 70 and a diode gating matrix generally designated 72 which is operable in conjunction with the flip-flop units for performing the various operations and functions of multiplying unit 52.

Electronic flip-flops units are widely used in the electronic switching art and the principles of their operation are well known to those skilled in the art. However, for purposes of clarification there is shown in FIG. 8 a circuit diagram of a flip-flop unit $F_i$ which may be utilized in multiplying unit 52. In structure, flip-flop unit $F_i$ shown in FIG. 8 is largely conventional and will be understood to assume a first stable conduction state (called the "1" state) in response to the application of a positive pulse signal to an S (set) input terminal, shown in FIG. 8, and will assume a second conduction state called the "0" state) in response to the application of a positive pulse signal to a Z (zero) input terminal which is also shown in FIG. 8. Simultaneous application of positive pulses to the S and Z input terminals will cause the flip-flop to trigger or reverse its conduction state. The signal applied to the S input terminal of flip-flop $F_i$ is designated as signal $SF_i$ while the signal applied to the Z input terminal is designated as signal $ZF_i$.

A pair of complementary voltage level signals $F^1$ and $\overline{F}^1$ are produced by flip-flop $F_i$, signal $F^1$ being at a high "1" representing voltage level when flip-flop $F_i$ is in its "1" state and being at a low "0" representing voltage level when flip-flop $F_i$ is in its "0" state, while on the other hand complementary signal $\overline{F}^1$ is at its low "0"-representing and high "1"-representing voltage levels, respectively, when flip-flop $F_i$ is in its corresponding "1" and "0" conduction states. It will be assumed hereinafter that the high and low levels of the output signals correspond to +28 volts and +22 volts respectively, these being convenient values for utilization of the output signal in diode gating matrices.

As indicated in FIG. 8 input signals $SF_i$ and $ZF_i$ are applied to flip-flop $F_i$ along corresponding input conductors which are respectively connected to input terminals S and Z, respectively, while output signals $F^1$ and $\overline{F}^1$ are respectively produced on two corresponding output conductors. It will be noted in FIG. 8 that the input and output conductors of flip-flop $F_i$ are designated in terms of the signals which appear on these conductors. It is believed that greater clarity of explanation may be obtained by so designated conductors rather than by adoption of separate designations for the conductors. The described practice will be followed throughout the present specification.

Referring again to multiplying unit 52 shown in FIG. 7 it is seen that output signal $F^1$ of flip-flop $F_1$ is directly applied to interval signal generating circuit 20a and may be identified with actuating signal $A_Y$ which initiates operation of generating circuit 20a when it rises to its high level of +28 volts. This equivalence of signal $A_Y$ and signal $F^1$ is stated by the following formula:

$$A_Y = F^1 \qquad (26)$$

In the same manner output signal $F^2$ is applied to the interval generating circuit 20b and may be identified as actuating signal $A_{Y'}$ hereinbefore described. This equivalence may be stated in terms of the simple formula:

$$A_{Y'} = F^2 \qquad (27)$$

Moreover, as indicated in FIG. 7, actuating signal $A_T$ which controls the operation of interval signal generating circuit 20c may be identified with the signal function $\overline{F}^1 \cdot \overline{F}^2$, this equivalence being expressed by the following formula:

$$A_T = \overline{F}^1 \cdot \overline{F}^2 \qquad (28)$$

where the dot (.) indicates the logical and operation.

As indicated by Formula 28 flip-flop output signals $\overline{F}^1$ and $\overline{F}^2$ are combined in a logical "and" gate, gate 75 shown in FIG. 7, to form the required actuating signal $A_T = \overline{F}^1 \cdot \overline{F}^2$. It will be understood that the actuating signal A will be at a high level only when signals $\overline{F}^1$ and $\overline{F}^2$ are both at their high levels and will otherwise be at a low level if either of signals $\overline{F}^1$ or $\overline{F}^2$ are at their low level. A suitable embodiment of "and" gate 75 is shown in FIGURE 4 on page 12 of an article entitled "An Algebraic Theory for Use in Digital Computer Design" by E. C. Nelson, published in the Transactions of the Professional Group on Electronic Computers of the I.R.E. in September 1954.

It will be understood from the foregoing, that setting of flip-flop $F_1$ to its 1-state will correspond to an initiation of an $x_Y$ time interval since when flip-flop $F_1$ is set to its 1-state, actuating signal $A_Y = F^1$ will rise to its high level thereby initiating operation of circuit 20a. Similarly setting of flip-flop $F_2$ to its 1-state corresponds to the initiation of an $x_{Y'}$ time interval, since actuating signal $A_{Y'} = F^2$ will then rise to its high level thereby initiating operation of generating circuit 20b. If flip-flops $F_1$ and $F_2$ are both zero, this will correspond to the initiation of the interval $x_T$, since then output signals $\overline{F}^1$ and $\overline{F}^2$ will both rise to their high levels causing signal $A_T = \overline{F}^1 \cdot \overline{F}^2$ to rise to its high level thereby initiating operation of interval signal generating circuit 20c. Thus in overall operation the production of electrically defined time intervals $x_Y$, $x_{Y'}$, and $x_T$ is directly controlled by flip-flops $F_1$ and $F_2$.

Flip-flop $F_4$, on the other hand, is not directly associated with the production of time intervals but is instead associated with the production of output signal train $\wp_{YM}$. As indicated in FIG. 7, output signal $F^4$ of flip-flop $F_4$ is equivalent to signal $\wp_{YM}$.

Flip-flop $F_3$ is utilized in the internal operations of multiplying unit 52 and follows a very simple sequence of operations. It is zeroed at each application of a clock pulse signal $Cl$ and changes state at each arrival of an interval signal $I_Y$, $I_{Y'}$ or $I_T$. Flip-flop $F_3$ is therefore called the counter flip-flop since it in effect counts the number of interval signals which are generated after the arrival of a timing signal $Cl$.

It will be understood that logical gating network 72 produces input signals which are applied to flip-flops $F_1$ through $F_4$ to set or zero them in the described manner as the computation proceeds. As shown in FIG. 7 logical gating network 72 is composed of elementary "and" and "or" gating circuits which are combined to mechanize predetermined functions assigned to the logical gating network. "And" and "or" gates and methods for combining them to mechanize required logical relationships are well known to the art and are described, for example, in the article by Nelson. Nelson's article also describes a widely used notation termed "logical algebra" which is particularly adapted for the description of logical gating circuits and networks.

Probably the most satisfactory manner of explaining the construction and operation of logical gating network 72, shown in FIG. 7, is to synthesize or derive a set of logical algebraic equations which together describe gating network 72. Derivation of the logical equations may be accomplished by providing waveform charts which illustrate the required waveforms of the output signals of flip-flops $F_1$ through $F_4$ in relation to the input signals which are received by multiplying unit 52. With the aid of these waveform charts the required logical equations of gating network 72 may be readily derived.

Consideration will now be given therefore to FIGS. 6e, 6f and 6g in which are illustrated voltage waveforms representative of signals $I_Y$, $I_Y'$ and $I_T$ respectively as they are produced by generating circuits 20a, 20b and 20c, respectively, during the course of the computation described hereinbefore in connection with FIG. 6c. Attention is also directed to FIGS. 6h through 6k in which are illustrated voltage waveforms of the signals $A_Y=F^1$, $A_Y'=F^2$, $A_T=\overline{F^1}.\overline{F^2}$ and $F^3$, respectively.

It will be remembered that the required sequence of time intervals shown in FIG. 6c began in period 1 with the initiation of a time interval $x_Y$. It is evident now that initiation of time interval $x_Y$ corresponds to the rise of signal $A_Y=F^1$ to its high level, as shown in FIG. 6h. Generating circuit 20a is then actuated by signal $A_Y$ so as to produce an interval signal $I_Y$ at the completion of time interval $x_Y$ as shown in FIG. 6e. Considering the remainder of the waveforms shown in FIGS. 6e and 6h it is seen that during each time interval $x_Y$, signal $A_Y=F^1$ is at its high level (corresponding to flip-flop $F_1$ being set to its 1-stage) at the beginning of the interval and at its low level (corresponding to flip-flop $F_1$ being returned to its 0-state) at the end of the interval, as marked by production of an interval signal $I_Y$.

In the same manner, viewing FIGS. 6f and 6i, during each time interval $x_Y'$ signal $A_Y'=F^2$ is at its high level (corresponding to flip-flop $F_2$ being set to its high level) at the beginning of the interval while the end of each time interval $x_Y'$ is marked by the production of an interval signal $I_Y'$ by generating circuit 20b. In addition, referring now to FIGS. 6g and 6j, it is clear that during each time interval $x_T$ (shown in FIG. 6c) signal $A_T=\overline{F^1}.\overline{F^2}$ is at its high level (corresponding to flip-flops $F_1$ and $F_2$ both being in their 0-states), while the end of each time interval $x_T$ is marked by the production of interval signal $I_T$ by generating circuit 20c.

Referring next to FIG. 6k it is seen that signal $F^3$ of flip-flop $F_3$ is uniformly at a low level immediately after the arrival of each timing signal $Cl$ (shown in FIG. 6a) and then rises to a high level at the time of production of any one of the interval signals $I_Y$, $I_Y'$, or $I_T$. If another interval signal is received during the same period signal $F^3$ again drops to its low level and remains at its low level for the duration of the period. However, if only one interval signal is received during the period, signal $F^3$ remains at a high level for the duration of the period as exemplified, for example, by the waveform of signal $F^3$ during periods 6, 7 and 8. It may be said, therefore, that the level of signal $F^3$ at the end of the period is indicative of the number of interval signals received during that period. If signal $F^3$ is high at the end of the period this indicates that only one interval signal was received during the period. However, if signal $F^3$ is low at the end of the period this indicates that two interval signals have been received during the period. However, it will be noted that production of only a single interval signal during the period corresponds to initiation of a time interval $x_Y$ or $x_Y'$ during that period without completion of the time interval during the same period. While production of two interval signals within a period corresponds to initiation and completion of a time interval within the same period, it will be remembered that according to Rule 4 failure of completion of an initiated time interval indicates that during the following period the corresponding signal of signal train $\mathcal{P}_{YM}$ should be at a high level while successful completion of an initiated time interval within the same period in which it was initiated indicates that durng the following period the corresponding signal of signal train $\mathcal{P}_{YM}$ should be at a low level. Accordingly, in view of the foregoing, the following two statements may be made about the significance of voltage levels of signal $F^3$ at the end of a period:

(1) A low level of signal $F^3$ at the end of a period indicates that a time interval has been initiated and successfully completed during the period while a high level of signal $F^3$ indicates that a time interval initiated during that period has failed of completion within the period.

(2) During each period the corresponding signal of signal train $\mathcal{P}_{YM}$ will have a level corresponding to the level of signal $F^3$ at the end of the preceding period.

It is now possible to briefly develop logical equations for the set ($SF_3$) and zero ($ZF_3$) input signals to flip-flop $F_3$. It will be remembered that flip-flop $F_3$ is to be zeroed upon each arrival of a timing signal $Cl$. This condition can be expressed by the partial zeroing equation:

$$ZF_3=Cl \qquad (29a)$$

It will also be remembered that flip-flop $F_3$ is to be triggered (forced to change state) upon each arrival of any of the interval signals $I_Y$, $I_Y'$, or $I_T$. To accomplish such triggering the interval signals should be applied simultaneously to both the set and zero input terminals of flip-flop $F_3$. This condition may be expressed by the equations:

$$ZF_3=I_Y+I_Y'+I_T \qquad (29b)$$

$$SF_3=I_Y+I_Y'+I_T \qquad (30)$$

Equation 30 above completely defines signal $SF_3$. To obtain the complete equation for signal $ZF_3$ it is necessary to combine those terms which are shown in Equations 29a and 29b above to obtain the complete zeroing equation:

$$ZF_3=Cl+I_Y+I_Y'+I_T \qquad (29)$$

Logical equations for the set ($SF_4$) and zero ($ZF_4$) of flip-flop $F_4$ may be readily derived. It will be remembered that flip-flop $F_4$ assumes during each period the same state that counter flip-flop $F_3$ had at the end of the preceding period (immediately before arrival of a timing signal $Cl$). These conditions are stated in logical algebraic terms by the following equations:

$$SF_4=F^3.Cl \qquad (31)$$

$$ZF_4=\overline{F^3}.Cl \qquad (32)$$

The logical equations for the set ($SF_1$) and zero ($ZF_1$) input signals to flip-flop $F_1$ will now be derived. As indicated in FIG. 6h, flip-flop $F_1$ is set to its 1-state during any period that the corresponding signal of signal train $\mathcal{P}_M$ is at a high level and either signal $I_T$ or signal $I_Y'$ is generated. Signal $SF_1$ may therefore be defined by the following formula:

$$SF_1=\mathcal{P}_M.(I_T+I_Y') \qquad (33)$$

On the other hand, as indicated by FIG. 6h and in accordance with Rule 1 and Rule 2, flip-flop $F_1$ is changed from its 1-state to its 0-state whenever the corresponding signal of signal train $\mathcal{P}_M$ is at a low level and a signal $I_Y$ is generated, or when signal train $\mathcal{P}_M$ is at a high level and a signal $I_Y$ is generated which is the second interval signal produced within the period (corresponding to the completion of a time interval $x$ initiated during the same period). These conditions for the zeroing of flip-flop $F_1$ may be expressed by the following logical algebraic formula:

$$ZF_1=\mathcal{P}_M.I_Y.F^3+\overline{\mathcal{P}}_M.I_Y \qquad (34)$$

Consideration is next directed to the derivation of logical equations for the set ($SF_2$) and zero ($ZF_2$) input signals to flip-flop $F_2$. It is clear from a consideration of FIG. 6i that flip-flop $F_2$ is changed from its 0-state to its 1-state only when the corresponding signal of signal train $\mathcal{P}_M$ is at a low level and either an interval signal $I_T$ or $I_Y$ is generated, this condition being expressed by the following formula:

$$SF_2 = \overline{\mathcal{P}}_M \cdot (I_T + I_Y) \quad (35)$$

On the other hand, flip-flop $F_2$ is changed from its 1-state to its 0-state whenever the corresponding signal of signal train $\mathcal{P}_M$ is at a high level and a signal $I_Y'$ is generated or when $\mathcal{P}_M$ is at a low level ($\overline{\mathcal{P}}_M$) and a signal $I_Y'$ is generated which is the second interval signal generated within the same period (a condition which can only occur if $F_3$ is at a high level since the first interval signal within the period must have set flip-flop $F_3$ to its 1-state). The following equation may therefore be written for the signal $ZF_2$:

$$ZF_2 = \overline{\mathcal{P}}_M \cdot I_Y' \cdot F^3 + \mathcal{P}_M \cdot I_Y' \quad (36)$$

Logical equations defining the set (S) and zero (Z) input signals for each of the flip-flops $F_1$ through $F_4$ have now been derived hereinabove. For purposes of clarification these equations are assembled below in regular order:

$$SF_1 = \mathcal{P}_M \cdot (I_T + I_Y') \quad (33)$$
$$ZF_1 = \mathcal{P}_M \cdot I_Y \cdot F^3 + \overline{\mathcal{P}}_M \cdot I_Y \quad (34)$$
$$SF_2 = \overline{\mathcal{P}}_M \cdot (I_T + I_Y) \quad (35)$$
$$ZF_2 = \overline{\mathcal{P}}_M \cdot I_Y' \cdot F^3 + \mathcal{P}_M \cdot I_Y' \quad (36)$$
$$SF_3 = I_Y + I_Y' + I_T \quad (30)$$
$$ZF_3 = Cl + I_Y + I_Y' + I_T \quad (29)$$
$$SF_4 = F^3 \cdot Cl \quad (31)$$
$$ZF_4 = \overline{F}^3 \cdot Cl \quad (32)$$

It will be understood by those skilled in the art that logical Equations 29 through 36 completely define the structure of logical gating network 72 of multiplying unit 52 as shown in FIG. 7. For example, referring particularly to Equation 33, it may be considered to define the structure and interconnections of those gating circuits of network 72 which produce the flip-flop input signal $SF_1$. In mechanizing the circuits which are defined by logical Equation 33 the "or" function ($I_T + I_Y'$) is provided by an "or" gate 78 shown in FIG. 7 while the final "and" function $\mathcal{P}_M \cdot (I_T + I_Y')$ is provided by an "and" gate 79, also shown in FIG. 7. "Or" gate 78 receives signal $I_T$ and signal $I_Y'$ and combines them to produce and output signal ($I_T + I_Y'$) which is at a high 1-representing level whenever either signal $I_T$ or signal $I_Y'$ is at a high 1-representing level. The output signal ($I_T + I_Y'$) produced by "or" gate 78 is applied to one input terminal of "and" gate 79, while signal $\mathcal{P}_M$ is applied to the other terminal of "and" gate 79. "And" gate 79 combines these applied input signals to produce the output signal $SF_1 = \mathcal{P}_M \cdot (I_T + I_Y')$ which is at a high 1-representing level only when both of the input signals to "and" gate 79 are at their high level. The output signal $SF_1$ produced by "and" gate 79 is applied to the S input terminal of flip-flop $F_1$ to set flip-flop $F_1$ to its one state whenever output signal $SF_1$ is at its high 1-representing level.

In view of the foregoing illustration of the manner in which the structure and interconnection of the gating circuits of gating network 72 is defined by logical Equations 29 through 36 derived hereinabove it is believed that further detailed description of gating network 72 is not required.

It has been stated that the multiplication process which is utilized by multiplier 10a, as defined by Rules 1 through 3, may be utilized in connection with any class of difunction representation. In particular in FIGS. 6a through 6k a specific example has been provided in which a multiplication is performed in accordance with these general rules utilizing time intervals $x_Y$ and $x_Y'$ which correspond to the +1, −1 class of difunction representation. It is believed however that it is also desirable to furnish a generalized mathematical proof applicable to any class of difunction representation of the multiplication process defined by Rules 1 through 3 and utilized in multiplier 10a. Those readers who are not interested in the mathematical basis of the operation of multiplier 10a may give the following proof only brief and casual consideration and pass on thereafter to consideration of the description supplied hereinbelow of a converter 10b shown in FIG. 9.

For the purposes of the following proof time intervals will be treated in an abstract manner. It is assumed that the quantity $Y = a/b$ is represented in the time interval form and the quantity $M = c/d$ is represented by difunction signal train $\mathcal{P}_M$. Proof is required that results obtained through application of Rules 1 through 4 will correspond to production of signals of a signal train $\mathcal{P}_{Y \cdot M}$ which represents the product $$Y \cdot M = \frac{ac}{bd}$$

The quantity $Y = a/b$ is therefore represented by the following time intervals:

$$x_Y = (N_1 Y - N_2) \frac{T}{N_1 - N_2} \quad (12)$$

$$x_Y' = (N_2 Y - N_2) \frac{T}{N_1 - N_2} \quad (13)$$

The quantity $M = c/d$ is represented by difunction signal train $\mathcal{P}_M$ in which a recurrence interval extends over $(E_1^M + E_2^M)$ periods of duration T, where in accordance with Formulas 3, 1 and 2:

$$E_1^M + E_2^M = d(N_1 - N_2) \quad (3)$$
$$E_1^M = c - N_2 d \quad (1)$$
$$E_2^M = N_1 d - c \quad (2)$$

it being considered that $E_1^M$ is the number of $N_1$ representing signals and $E_2^M$ the number of $N_2$ representing signals in a recurrence interval of signal train $\mathcal{P}_M$.

It is clear that a number of repetitions of the basic recurrence interval of input signal train $\mathcal{P}_M$ must occur before a single recurrence interval of output signal train $\mathcal{P}_{Y \cdot M}$ may be completed. By analogy to Formulas 1 through 3, a recurrence interval of signal train $\mathcal{P}_{Y \cdot M}$ would extend over $E_1^{Y \cdot M} + E_2^{Y \cdot M}$ periods of duration T where:

$$E_1^{Y \cdot M} + E_2^{Y \cdot M} = bd(N_1 - N_2) \quad (37)$$

it being understood that $E_1^{Y \cdot M}$ is the number of $N_1$ representing signals and $E_2^{Y \cdot M}$ the number of $N_2$ representing signals in a recurrence interval of signal train $\mathcal{P}_{YM}$.

From a consideration of Formulas 3 and 37 it is clear that a recurrence interval of $\mathcal{P}_{Y \cdot M}$ would be $b$ times larger in duration than the recurrence interval of $\mathcal{P}_M$ and that therefore there must occur $b$ repetitions of the basic repetition interval of $\mathcal{P}_M$ before a single recurrence interval of $\mathcal{P}_{Y \cdot M}$ may be completed.

Consider therefore a sequence of operations which extends over $b$ recurrence intervals of input signal train $\mathcal{P}_M$. During these $b$ recurrence intervals, the total number of $N_1$ and $N_2$ representing signals in signal train $\mathcal{P}_M$ would be $bE_1^M$ and $bE_2^M$, respectively. Restating this in algebraic terms:

$$(E_1^M)t = b \cdot E_1^M \quad (38)$$
$$(E_2^M)t = b \cdot E_2^M \quad (39)$$

where: $(E_1^M)t$ is the total number of $N_1$ representing signals in input signal train $\mathcal{P}_M$ during a recurrence interval of output signal train $\mathcal{P}_{YM}$, while $(E_2^M)t$ is the total number of $N_2$ representing signals in input signal train $\mathcal{P}_M$ during the same recurrence interval of output signal train $\mathcal{P}_{Y \cdot M}$.

It will be remembered that during the course of a multiplication, in accordance with Rule 1, each $N_1$ representing signal of $\mathcal{P}_M$ causes initiation of a time interval $x_Y$ while each $N_2$ representing signal of $\mathcal{P}_M$ causes initiation of a time interval $x_Y'$. The total duration of the sum of all of the time intervals $x_Y$ and $x_Y'$ which will be produced during the recurrence interval of $\mathcal{P}_{YM}$ is therefore expressed by the following formula:

Total duration of sum of $x_Y$ and $x_{Y'}$ time
$$\text{intervals} = (E_1^M)t.x_Y + (E_2^M)t.x_{Y'} \quad (40)$$

According to Rule 4, presented hereinabove, each time a time interval $x_Y$ or $x_{Y'}$ which is initiated in one period overlaps into a succeeding period, an $N_1$ representing signal is produced in output signal train $\mathcal{P}_{Y.M}$. It is evident that the total number of overlaps occurring during a recurrence interval of $\mathcal{P}_{Y.M}$ must correspond to the quotient obtained by dividing the composite duration of the $x_Y$ and $x_{Y'}$ time intervals by the duration T of an individual period. Therefore the number of $N_1$ representing signals ($E_1^{Y.M}$) produced in output signal train $\mathcal{P}_{Y.M}$ during its recurrence interval may be expressed by the following formula:

$$E_1^{Y.M} = \frac{1}{T}[(E_1^M)t.x_Y + (E_2^M)t.x_{Y'}] \quad (41)$$

Expanding Formula 41 by substitution of equivalent expressions for $(E_1^M)t$, $(E_2^M)t$, $x_Y$, and $x_{Y'}$ obtained from Formulas 38, 39, 12 and 13, respectively, Formula 41 is converted to the following form:

$$E_1^{YM} = \frac{1}{T}\left[b.E_1^M.(N_1Y - N_2)\frac{T}{N_1 - N_2}\right.$$
$$\left. + b.E_2^M.(N_2Y - N_2)\frac{T}{N_1 - N_2}\right] \quad (42)$$

Then, substituting equivalent expressions for $E_1^M$ and $E_2^M$ as obtained from Formulas 1 and 2, Formula 42 may be rewritten as:

$$E_1^{YM} = \frac{1}{T}\left[b.(c - N_2d)(N_1Y - N_2)\frac{T}{N_1 - N_2}\right.$$
$$\left. + b.(N_1.d - c)(N_2Y - N_2)\frac{T}{N_1 - N_2}\right] \quad (43)$$

It will be remembered that in the present proof it is assumed that $Y = a/b$. After substitution of this value for Y, Formula 43 above may be greatly reduced by straightforward algebraic manipulations which are presented without comment below:

$$E_1^{YM} = \frac{1}{T}\left[b(c - N_2d)\left(N_1\frac{a}{b} - N_2\right)\frac{T}{N_1 - N_2}\right.$$
$$\left. + b(N_1d - c)\left(N_2\frac{a}{b} - N_2\right)\frac{T}{N_1 - N_2}\right]$$

$$= b(c - N_2d)\frac{\left(N_1\frac{a}{b} - N_2\right)}{(N_1 - N_2)} + b(N_1d - c)\frac{\left(N_2\frac{a}{b} - N_2\right)}{N_1 - N_2}$$

$$= (c - N_2d)\frac{(N_1a - N_2b)}{(N_1 - N_2)} + (N_1d - c)\frac{(N_2a - N_2b)}{(N_1 - N_2)}$$

$$= \frac{\begin{array}{c}(N_1ac - N_2bc - N_1N_2ad + N_2^2bd) \\ + (N_1N_2ad - N_1N_2bd - N_2ac + N_2bc)\end{array}}{N_1 - N_2}$$

$$= \frac{(N_1 - N_2)ac - bdN_2(N_1 - N_2)}{N_1 - N_2}$$

$$E_1^{YM} = ac - bdN_2 \quad (44)$$

It will be remembered that, according to Formula 37:

$$E_1^{YM} + E_2^{YM} = 2bd(N_1 - N_2) \quad (37)$$

It is therefore possible to evaluate $E_2^{YM}$ by combining Formulas 37 and 44 and solving for $E_2^{YM}$. The following expression is thereby obtained:

$$E_2^{YM} = N_1bd - ac \quad (45)$$

In Formulas 44 and 45 there have been obtained expressions for $E_1^{YM}$ and $E_2^{YM}$. Since $E_1^{YM}$ is the number of $N_1$ representing output signals produced during a recurrence interval of $\mathcal{P}_{YM}$ and $E_2^{YM}$ is the number of $N_2$ representing output signals produced during the recurrence interval of $\mathcal{P}_{YM}$, it is therefore now possible to discover the quantity represented by signal train $\mathcal{P}_{YM}$ by finding the algebraic average $A_v^{YM}$ of the $N_1$ and $N_2$ representing signals produced during the recurrence interval. By analogy to Formula 4:

$$A_v^{YM} = \frac{E_1^{YM}.N_1 + E_2^{YM}.N_2}{E_1^{YM} + E_2^{YM}}$$

$$= \frac{(a.c - b.d.N_2).N_1 + (N_1.b.d - a.c).N_2}{bd(N_1 - N_2)}$$

$$= \frac{N_1ac - N_1N_2bd + N_1N_2bd - N_2ac}{bd(N_1 - N_2)}$$

$$= \frac{ac(N_1 - N_2)}{bd(N_1 - N_2)}$$

$$A_v^{YM} = \frac{ac}{bd} \quad (46)$$

As shown by Formula 46, the number $$\frac{ac}{bd}$$

is the quantity which is represented by the output signals of $\mathcal{P}_{YM}$ as obtained through application of Rules 1 through 4. Since the number $$\frac{ac}{bd}$$

is the required product of the input quantities $Y = a/b$ and $M = c/d$, it is clear that signal train $\mathcal{P}_{YM}$ does indeed represent the product of the input quantities Y and M and therefore the correctness of the general multiplication process has been proved.

As described hereinbefore in the operation of multiplier 10a shown in FIG. 5 analog signal $S_Y$ is transformed to equivalent electrically marked time intervals by signal generating unit 50, these equivalent time intervals being combined in multiplying unit 52 with the input difunction signal train $\mathcal{P}_M$ to form the output difunction signal train $\mathcal{P}_{YM}$ which represents the product Y.M of the input quantities Y and M represented by $S_Y$ and $\mathcal{P}_M$, respectively. It will now be shown that a simplified modification of multiplier 10a may also be utilized for converting an analog input signal to an equivalent difunction signal train.

An analog-to-difunction conversion is said to be accomplished whenever an analog input signal which represents an input quantity is transformed into a difunction signal train which represents the same input quantity. If, for example, the analog input signal $S_Y$ which represents the quantity Y is transformed into an equivalent difunction signal train $\mathcal{P}_Y$ which also represents the same quantity Y, then an analog-to-digital conversion has been performed upon the analog signal $S_Y$.

A preferred manner of accomplishing an analog-to-difunction conversion is to treat the conversion process as a special case of the general multiplication process which has been described in connection with FIGS. 5, 6, and 7. Consider, for example, the special case which occurs when input signal train $\mathcal{P}_M$ represents the quantity $M = 1$. In this event output signal train $\mathcal{P}_{YM}$ will represent the quantity Y.1 or Y and therefore a conversion will have been accomplished of analog signal $S_Y$ to an equivalent difunction signal train $\mathcal{P}_Y$.

Thus it is clear that multiplier 10a may always be utilized as a converter if input signal train $\mathcal{P}_M$ is made to represent the quantity $M = 1$. In most classes of difunction representation both $N_1$ and $N_2$ representing signals are required in a signal train which represents the quantity 1. However, in certain classes of difunction representation, notably those classes in which $N_1 = 1$ such as the +1, −1 class ($N_1 = +1$, $N_2 = -1$) and the 1, 0 class ($N_1 = 1$, $N_2 = 0$), the number 1 is represented by a difunction signal train which comprises a continuous series of $N_1$ representing signals and does not include any $N_2$ representing signals. It is clearly unnecessary in this instance to generate a difunction signal train which represents the quantity 1. The value of each signal in such a signal train would be known in advance and it is clear that any functions which might be accomplished by such a signal train could readily be incorporated in the structure of a modified multiplying unit.

Moreover since no $N_2$ representing signals would ever occur in an input difunction signal train which represents the quantity 1 in the classes noted above, it is clear that production of the electrically defined time interval $x_Y'$ would never be required. Therefore interval signal $I_Y'$ need not be generated in a modified multiplying unit of the type described. Accordingly, if a simple conversion to difunction in any $N_1=1$, $N_2$ class is desired, considerable reductions of equipment may be obtained by utilizing a modified multiplier which does not require an input difunction signal train and which moreover does not require the production of the time interval $x_Y'$.

Referring now to FIG. 9 there is shown a converter $10b$ which is essentially a modified multiplier of the type hereinbefore described. As shown in FIG. 9 converter $10b$ includes a modified signal generating unit $50b$ which is adapted for producing electrically defined time intervals $x_Y$ and $x_T$ and a modified multiplying unit $52b$ which is designated as an $I.1$ multiplying unit, this designation being descriptive of the functioning of multiplying unit $52b$. Modified signal generating unit $50b$ as shown in FIG. 9 includes two signal generating circuits $20a$ and $20c$ hereinbefore described in connection with FIG. 7. As shown in FIG. 9 generating circuit $20a$ is controlled by analog signal $S_Y$ and is responsive to an actuating signal $A_Y$ applied thereto by multiplying unit $52b$ for producing interval signal $I_Y$ at the time interval $x_Y$ after actuation. In the same manner interval generating circuit $20c$ is responsive to actuation signal $A_T$ applied thereto by multiplying unit $52b$ for producing interval signal $I_T$ at the time interval $x_T=T$ after actuation.

The interval signals $I_Y$ and $I_T$ are applied to multiplying unit $52b$ which also receives timing signal $Cl$ from digital signal source 11, multiplying unit $52b$ operating upon signals $I_Y$, $I_T$ and $Cl$ to produce further actuating signals and to produce output difunction signal train $\mathcal{P}_Y$ which represents in difunction form the quantity Y which was originally represented in analog form by signal $S_Y$.

It will be understood that in the overall operation of converter $10b$, electrically marked time intervals $x_Y$ and $x_T$ will be produced by generating unit $50b$ in ordered sequence in accordance with a predetermined scheme of computation, the sequence of production of time intervals $x_Y$ and $x_T$ being controlled by multiplying unit $52b$ through its production of corresponding actuating signals $A_Y$ and $A_T$. It will be further understood that the rules which govern the aforementioned scheme of computation correspond generally with Rules 1 through 4 hereinbefore supplied which govern the multiplication process utilized in multiplier $10a$ shown in FIG. 5. However, for application to converter $10b$ shown in FIG. 9 Rules 1 through 4 are restated in a somewhat different form as illustrated by the following Rules $1a$ through $4a$.

*Rule 1a.*—During each period (of timing signal $Cl$ and of output signal train $\mathcal{P}_Y$) a single time interval is initiated.

*Rule 2a.*—If a time interval $x_Y$ is completed during the same period in which it was initiated, a time interval $x_T$ is initiated. However, if a time interval $x_Y$ is not completed until the period following that in which it was initiated, another time interval $x_Y$ is initiated in accordance with Rule $1a$.

*Rule 3a.*—Upon completion of a time interval $x_T$ a time interval $x_Y$ is initiated in accordance with Rule $1a$.

*Rule 4a.*—If a time interval $x_Y$ is completed during the same period in which it is initiated, then during the following period the corresponding signal of signal train $\mathcal{P}_Y$ will be at its low level representing the number $N_2$. However, if a time interval $x_Y$ is not completed during the same period in which it was initiated then during the following period the corresponding signal of signal train $\mathcal{P}_Y$ will be at its high level representing the number $N_1$.

It is seen that Rules $1a$ through $4a$ for conversion correspond in form to Rules 1 through 4 for multiplication if it is assumed that only $N_1$ representing signals are supplied in an input difunction signal train. Thus according to Rules $1a$ through $4a$ only the time intervals $x_Y$ and $x_T$ are utilized, the time interval $x_Y'$ never being called for. Nor indeed is any mention made in Rules $1a$ through $4a$ of any input signal train. Effectively, all the functions which are accomplished in a multiplier by an input difunction signal train are for a converter incorporated in the logical structure of Rules $1a$ through $4a$.

In FIG. 10 there is shown a circuit diagram of a preferred embodiment of multiplying unit $52b$ for combining intervals $I_Y$ and $I_T$ and timing signal $Cl$ to produce actuating signals $A_Y$ and $A_T$ and difunction signal train $\mathcal{P}_Y$. As shown in FIG. 10 unit $52b$ includes three flip-flops $F_5$, $F_6$ and $F_7$ and also includes a logical gating network $72b$ which supplies set and zero input signals to flip-flops $F_5$ through $F_7$. As indicated in FIG. 10 output signal $F^5$ of flip-flop $F_5$ is utilized as actuating signal $A_Y$ and is applied to interval generating circuit $20a$ to initiate production of interval signals $I_Y$ by circuit $20a$. This equivalence of signal $F^5$ to signal $A_Y$ is indicated by the following logical equation:

$$A_Y = F^5 \tag{47}$$

The complementary output signal $\overline{F}^5$ of flip-flop $F_5$ is utilized as actuating signal $A_T$ and is applied to interval generating circuit $20c$ to initiate production of interval signal $I_T$. The equivalence of signal $\overline{F}^5$ and $A_T$ is indicated by the logical equation:

$$A_T = \overline{F}^5 \tag{48}$$

Thus in operation of multiplying unit $52b$, flip-flop $F_5$ may be considered to be a control flip-flop which when it is in the 1-state causes actuation of circuit $20a$ and when it is in the 0-state causes actuation of circuit $20c$.

Flip-flop $F_6$ is utilized as a counter which keeps track of the number of interval signals which have been generated within a single period. Flip-flop $F_6$ is zeroed upon the occurrence of a timing signal $Cl$ at the beginning of a period and thereafter triggers (changes state) upon each occurrence of an interval signal $I_Y$ or $I_T$. Thus, until the first interval signal is produced within a period flip-flop $F_6$ remains in the 0-state to which it was set at the beginning of the period by timing signal $Cl$. Upon the first occurrence of an interval signal $I_Y$ or $I_T$ flip-flop $F_6$ is triggered to its 1-state, remaining in its 1-state until a second interval signal is produced which triggers flip-flop $F_6$ back to its 0-state. If a second interval signal does not arrive within the period (indicating that a time interval $x_Y$ was initiated but not completed during the period) then flip-flop $F_6$ will remain at a high level for the duration of the period. Thus, the final state of flip-flop $F_6$ at the end of a period indicates whether or not the time interval initiated during that period has been completed and therefore the final state of flip-flop $F_6$ at the end of a period indicates, according to Rule $4a$, the level of that output signal of difunction signal train $\mathcal{P}_Y$ which is to be produced during the succeeding period.

As indicated in FIG. 10 the output signals of signal train $\mathcal{P}_Y$ are supplied by flip-flop $F_7$, signal train $\mathcal{P}_Y$ being equivalent to output signal $F^7$ of flip-flop $F_7$. This equivalence is indicated by the logical equation:

$$F^7 = \mathcal{P}_Y \tag{49}$$

Rules for the zeroing and setting of flip-flop $F_7$ are fairly simple. At the beginning of each period flip-flop $F_7$ is set to a state which corresponds to the state of flip-flop $F_6$ at the end of the preceding period. Thus, if flip-flop $F_6$ is at its 1-state at the end of a period (corresponding to lack of completion of an initiated time interval $x_Y$), flip-flop $F_7$ will be set to its 1-state at the beginning of the immediately succeeding period. However, if flip-flop $F_6$ is in its 0-state at the end of a period (corresponding to completion within the period of an initiated time interval $x_Y$) then flip-flop $F_7$ will be zeroed (set to its 0-state) at the beginning of the succeeding period.

The function of logical gating network $72b$ is to apply set and zero input signals to flip-flops $F_5$ through $F_7$ in accordance with the above-described rules. Logical equations which are descriptive of logical gating network $72b$ may be readily derived from a study of FIGS. 11$a$ through 11$h$ in which are shown waveforms and charts illustrative of the operation of converter 10$b$ during the performance of a particular conversion.

It is assumed for the purposes of the example which is illustrated by FIGS. 11$a$ through 11$h$ that the analog signal $S_Y$ which is applied to signal generating unit 50$b$ represents the quantity $Y = -\frac{1}{2}$. It is moreover assumed that interval generating circuit 20$a$ is adjusted so that it produces in response to actuation an electrically marked time interval $x_Y$ which represents the quantity $Y = -\frac{1}{2}$ in the $+1$, $-1$ class of difunction representation. Therefore according to Formula 12:

$$x_Y = (N_1 Y - N_2) \cdot \frac{T}{N_1 - N_2}$$

$$= [+1Y - (-1)] \cdot \frac{T}{+1 - (-1)}$$

$$= \frac{T}{4} \tag{50}$$

Referring now to FIGS. 11$a$ through 11$h$, in FIG. 11$a$ the waveforms of timing signals $Cl$ are illustrated as dividing time into equal periods of duration T, successive periods being numbered 1 through 5 as shown in FIG. 11$a$. FIG. 11$b$ is a composite time interval chart which illustrates the sequencing or ordering of time intervals $$x_Y = \frac{T}{4}$$

and $x_T = T$ in accordance with Rules 1$a$ through 4$a$. In FIG. 11$c$ there is shown the corresponding waveforms of output signal train $\mathcal{P}_Y$. It will be remembered, as indicated in FIG. 11$c$, that signal train $\mathcal{P}_Y$ corresponds to output signal $F^7$ of flip-flop $F_7$. In FIG. 11$d$ there are shown the waveforms of signals $I_Y$ which are produced by interval generating circuit 20$a$ in response to actuation by actuating signal $A_Y = F^5$ at its high level, shown in FIG. 11$f$. In FIG. 11$e$ there are displayed the waveforms of interval signals $I_T$ which are produced by signal generating circuit 20$c$ in response to preceding actuation of the generating circuit by actuating signal $A_T = F^5$ at its high level, shown in FIG. 11$g$. The output signal $F^6$ of counter flip-flop $F_6$ is illustrated in FIG. 11$h$. A careful examination of the composite waveform chart in FIG. 11$b$ will now be made for the purpose of demonstrating that the sequencing of time intervals $x_Y$ and $x_T$ shown in FIG. 11$b$ does indeed correspond with Rules 1$a$ through 4$a$ supplied hereinabove.

The operation begins, it will be assumed, in the first period with the arrival of an interval signal $I_Y$, shown in FIG. 11$d$, marking the end of a time interval $x_Y$ which has overlapped into the first period. In accordance with Rules 1$a$ and 2$a$, a time interval $x_Y$ is to be now initiated, and therefore flip-flop $F_5$ must remain in its 1-state as indicated by FIG. 11$f$. Since the electrically marked time interval $x_Y$ is completed within the first period, a second interval signal $I_Y$ marking the end of this time interval occurs in the first period, as shown in FIG. 11$d$.

It is thus seen that during the first period the time interval $x_Y$ was both initiated and completed and therefore, a time interval $x_T$ is immediately initiated in accordance with Rule 2$a$. Therefore, the second interval signal $I_Y$ is utilized for zeroing flip-flop $F_5$ so that signal $F^5$ is raised to its high level causing interval generating circuit 20$c$ to produce an interval signal $I_T$ after the time interval $x_T = T$ has elapsed. The first interval signal $I_T$ shown in FIG. 11$e$ therefore marks the end of the time interval $x_T$ illustrated in FIG. 11$b$.

The description of the time intervals illustrated in FIG. 11$b$ will be continued without further reference to the interval signals $I_Y$ and $I_T$ which mark these time intervals. At the completion of time interval $x_T$ in period 2 a time interval $x_Y$ is immediately initiated in accordance with Rule 3$a$. The time interval $x_Y$ initiated in period 2 is also completed within period 2 and therefore in accordance with Rule 2$a$ another time interval $x_T$ is initiated which is completed in period 3. Once again therefore in period 3, in accordance with Rules 1$a$ and 2$a$ another time interval $x_T$ is initiated which is completed during period 4. Again the time interval $x_Y$ is initiated in period 4 which is not completed until period 5. Upon the completion of this overlapping period which extends from period 4 to period 5 another time interval $x_Y$ is initiated and completed within period 5 followed by the initiation of still another time interval $x_Y$ in accordance with Rules 1$a$ and 2$a$.

It will be noted, referring to FIG. 11$c$ that the successive output signals of flip-flop $F_7$ correspond to the results obtained through the application of Rule 4$a$ to the ordered time intervals shown in FIG. 11$b$. Thus in period 1, since the time interval $x_Y$ was both initiated and completed in period 1, signal $F^7 = \mathcal{P}_Y$ is at a low level representing the number $N_2 = -1$ during the succeeding period 2. Similarly during periods 2 and 3 time intervals $x_Y$ are both initiated and completed and therefore during the corresponding following periods 3 and 4 signal $F^7$ is similarly at a low level. However, in period 4 an interval $x_Y$ is initiated which is not completed until period 5 and therefore during period 5 signal $F^7$ is raised to its high level representing the number $N_1 = +1$.

Assuming a recurrence interval of signal train $\mathcal{P}_Y$ shown in FIG. 11$c$ (a recurrence interval of this signal train clearly extends over four periods) it is seen that within a recurrence interval there are three signals representing the number $-1$ and one signal representing the number $+1$. An algebraic average $(A_v)$ is therefore represented by the following equation:

$$A_v = \frac{1 \cdot (+1) + 3 \cdot (-1)}{4}$$

$$= -\frac{1}{2} \tag{51}$$

Since the algebraic average extending over the recurrence interval is equal to the number represented by signal train $\mathcal{P}_Y$ it is clear that output signal train $\mathcal{P}_Y$ does indeed represent the required quantity $Y = -\frac{1}{2}$ and thus the conversion of the analog signal $S_Y$ to an equivalent difunction signal $\mathcal{P}_Y$ has been successfully accomplished in the present example through application of Rules 1$a$ through 4$a$.

It is now possible from the waveforms shown in FIGS. 11$a$ through 11$h$ to derive the logical equations for the set and zero input signals to flip-flops $F_5$ through $F_7$. Derivation of these logical equations will begin with a consideration of the set $(SF_6)$ and zero $(ZF_6)$ input signals to flip-flop $F_6$. As indicated in FIG. 11$h$ and as hereinbefore described, flip-flop $F_6$ is zeroed upon each occurrence of the timing signal $Cl$ and thereafter is triggered (changes state) upon each occurrence of an interval signal $I_Y$ or $I_T$ so that the final state of flip-flop $F_6$ at the end of a period indicates whether or not a time interval $x_Y$ was both initiated and completed within the period. The fact that $F_6$ is zeroed by application of timing signal $Cl$ is expressed by the following partial logical equation:

$$ZF_6 = Cl \tag{52}$$

The triggering of flip-flop $F_6$ upon the occurrence of signals $I_Y$ or $I_T$ may be accomplished by applying each of these signals to both the set (S) and zero (Z) input terminals of flip-flop $F_6$. It will be remembered that the flip-flops which are utilized change state when they receive simultaneous signals at both input terminals. This triggering operation of flip-flop $F_6$ is expressed by the following logical equations:

$$SF_6 = I_Y + I_T \qquad (53)$$

$$ZF_6 = I_Y + I_T \qquad (54a)$$

The complete setting function for flip-flop $F_6$ is expressed by Equation 53 above, the complete zeroing function for flip-flop $F_6$ may be obtained by combining Equations 52 and 54a above to obtain the following equation:

$$ZF_6 = Cl + I_T + I_Y \qquad (54)$$

Referring next to flip-flop $F_7$ it will be remembered that upon each occurrence of a timing signal $Cl$ flip-flop $F_7$ is set to the state which was formerly maintained by flip-flop $F_6$. This relationship is expressed by the following logical equations:

$$SF_7 = Cl.F^6 \qquad (55)$$

$$ZF_7 = Cl.\overline{F^6} \qquad (56)$$

Referring next to flip-flop $F_5$ it is seen that upon each occurrence of interval signal $I_T$ marking the end of interval $x_T$ flip-flop $F_5$ is set to its 1-state so as to initiate the production of a time interval $x_Y$. This relationship is expressed by the following logical equation:

$$SF_5 = I_T \qquad (57)$$

On the other hand, flip-flop $F_5$ is zeroed (to initiate an $x_T$ time interval) only when a signal $I_Y$ arrives marking the completion of a time interval $x_Y$ initiated during the same period. When this condition of completion of the time interval $x_Y$ within the same period in which it was initiated is satisfied flip-flop $F_6$ will be in its 1-state at the end of occurrence of the signal $I_Y$. Therefore the zeroing function for flip-flop $F_5$ may be written as the following logical equation:

$$ZF_5 = I_Y.F^6 \qquad (58)$$

For purposes of conciseness the logical equations derived hereinabove for the set and zero input signals to flip-flops $F_5$ through $F_7$ are assembled below in regular order:

$$SF_5 = I_T \qquad (53)$$

$$ZF_5 = I_Y.F^6 \qquad (54)$$

$$SF_6 = I_T + I_Y \qquad (55)$$

$$ZF_6 = Cl + I_T + I_Y \qquad (56)$$

$$SF_7 = Cl.F^6 \qquad (57)$$

$$ZF_7 = Cl.\overline{F^6} \qquad (58)$$

As described hereinbefore the logical equations which have been derived for logical gating network 72b shown in FIG. 10 are completely descriptive of the structure of the gating network. Each "and" (.) term of the logical equations corresponds to an equivalent "and" gate shown in FIG. 10 while each "or" (+) term corresponds to an equivalent "or" gate. For example, referring to logical Equation 57 which defines the set ($SF_7$) input signal to flip-flop $F_7$, Equation 57 indicates that in the formation of signal $SF_7$ signals $Cl$ and $F^6$ are to be applied to an "and" gate ("and" gate 80 shown in FIG. 10) which combines these input signals to produce the output signal $SF^7$ which is at a high level only when signals $Cl$ and $F^6$ are both at a high level. In a similar manner each of the other logical equations may be directly related to the corresponding circuit structure shown in FIG. 10.

In the overall operation of converter 10b shown in FIG. 9, the time interval $x_Y$ produced by signal generating circuit 20c, is directly representative of the input quantity Y which was represented by the analog input signal $S_Y$. Effectively, through operation of signal generating unit 50b, the input quantity Y is transformed from analog signal form to an equivalent time interval form. It is clear however that with use of a modified signal generating unit, time intervals may be produced which represent predetermined mathematical functions of input quantities originally supplied in analog signal form. Stated in another manner, the time intervals produced by such a modified signal generating unit do not directly represent the input quantities but rather represent the results of predetermined mathematical operations upon the input quantities. The time intervals thus produced may be utilized in further mathematical operations before transformation to difunction form or they may be directly converted to difunction form.

Referring now to FIG. 12 there is shown a generic embodiment of a computing system 10c which is responsive to analog signals $S_{Y3}$ and $S_{Y4}$ for producing a difunction signal train $\mathcal{D}_{f(Y3,Y4)}$ which represents a predetermined mathematical function $f(Y3,Y4)$ of the quantities Y3 and Y4 represented by the analog signals. As indicated in FIG. 12, within computing system 10c, the analog signals $S_{Y3}$ and $S_{Y4}$ are applied to a modified interval signal generating unit 50c which includes a modified signal generating circuit 100 responsive to the analog signals for producing an electrically marked time interval, designated $x_{f(Y3,Y4)}$ which represents (in time interval form), the predetermined mathematical function $f(Y3,Y4)$. It will be understood that the time interval $x_{f(Y3,Y4)}$ corresponds to the time interval elapsing between actuation of circuit 100 and production by circuit 100 of a corresponding interval signal $I_{f(Y3,Y4)}$ which marks the completion of time interval $x_{f(Y3,Y4)}$.

As indicated in FIG. 12, circuit 100 is actuated by a signal $A_{f(Y3,Y4)}$ which is applied thereto by the $I.1$ multiplying unit 52b described hereinbefore in connection with converter 10b shown in FIG. 9. Unit 52b in addition applies the actuating signal $A_T$ to signal generating circuit 20c (included within unit 50c), to cause production by circuit 20c of the interval signal $I_T$ at the time interval $x_T = T$ after actuation. In turn the interval signals $I_{f(Y3,Y4)}$ and $I_T$, produced by circuits 100 and 20c are applied to multiplying unit 52b, where they are utilized for the formation of the difunction output signal train $\mathcal{D}_{f(Y3,Y4)}$.

It is clear that in many respects the overall operation of computing system 10c shown in FIG. 12 is similar to the operation of converter 10b shown in FIG. 9. For example in the operation of converter 10b a time interval $x_Y$ is produced which represents the input quantity Y, this time interval $x_Y$ being supplied to $I.1$ multiplying unit 52b for conversion to an equivalent difunction signal $\mathcal{D}_Y$. In the operation of computing system 10c shown in FIG. 12, the only significant difference is that circuit 100 produces a time interval $x_{f(Y3,Y4)}$ which represents the predetermined mathematical function $f_{(Y3,Y4)}$ of the input quantities Y3, Y4, this time interval being transformed by multiplying unit 52b into the equivalent difunction signal train $\mathcal{D}_{f(Y3,Y4)}$. Thus the total difference in function between converter 10b shown in FIG. 9 and computing system 10c shown in FIG. 12 is accounted for by the use of the modified interval signal generating circuit 100 in signal generating unit 50c of computing system 10c. In all other respects system 10c and converter 10b are identical.

It is therefore appropriate to describe how various mathematical functions of the input quantities Y3, Y4 may be generated in time interval form through utilization of particular corresponding embodiments of interval signal generating circuit 100 in signal generating unit 50c. The first mathematical function which will be considered in connection with computing system 10c is that in which:

$$f(Y3,Y4) = Y3.Y4 - 1 \qquad (59)$$

A corresponding embodiment 100a of signal generating circuit 100 is shown in FIG. 13a. As shown in FIG. 13a, circuit 100a is generally similar to signal generating circuit 20 shown in FIG. 3 and comprises a pulse generator 22 which produces the interval signal $I_{Y3,Y4-1}$ at a time interval after actuation which is controlled by a charging circuit 21d in which a variable resistor R is controlled by analog signal Y3 and a variable capacitor C is controlled by analog signal Y4. It will be assumed in connection with circuit 100a that the magnitude of the variable resistor R is related to the amplitude of the input quantity Y3 by the following equation:

$$R = K_1 Y_3 \quad (60)$$

and that the magnitude of capacitor C is similarly related to the magnitude of input quantity Y4 by the equation:

$$C = K_2 \cdot Y_4 \quad (61)$$

It is clear that the interval signal $x_{f(Y3,Y4)}$ is related to the values of R and C by the following equation:

$$x_{f(Y3,Y4)} = KRC \quad (62)$$

Combining Equations 60 through 62 there is obtained the following equation:

$$x_{f(Y3,Y4)} = K \cdot K_1 \cdot K_2 \cdot Y3 \cdot Y4 \quad (63)$$

It will be further assumed that K, K1 and K2 have values such that:

$$K \cdot K_1 \cdot K_2 = \frac{N_1 T}{N_1 - N_2} \quad (64)$$

Substituting these values for $K.K1.K2$ in Equation 63 there is obtained the following equation for $x_{f(Y3,Y4)}$:

$$x_{f(Y3,Y4)} = N_1 Y3Y4 \cdot \frac{T}{N_1 - N_2} \quad (65)$$

The quantity $N_1 Y3Y4$ may be expanded by both adding and subtracting $N_2$ to obtain the following equation:

$$N_1 Y3Y4 = N_1 \left( Y3Y4 + \frac{N_2}{N_1} \right) - N_2 \quad (66)$$

The expression for $N_1 Y3Y4$ developed in Equation 66 above is now substituted in Equation 65 to obtain the equation:

$$x_{f(Y3Y4)} = \left[ N_1 \left( Y3Y4 + \frac{N_2}{N_1} \right) - N_2 \right] \cdot \frac{T}{N_1 - N_2} \quad (67)$$

It will be remembered that for time interval $x_Y$ which represents a quantity Y:

$$x_Y = [N_1(Y - N_2)] \cdot \frac{T}{N_1 - N_2} \quad (12)$$

By analogy therefore comparing Equations 12 and 67 it is evident that the time interval $x_{f(Y3,Y4)}$ must represent the quantity $$\left( Y3Y4 + \frac{N_2}{N_1} \right)$$

In the +1, −1 class of difunction representation (in which $N_1 = +1$, $N_2 = -1$) the quantity $$\frac{N_2}{N_1}$$

will equal −1 and therefore, in the +1, −1 class:

$$f_{(Y3,Y4)} = Y3 \cdot Y4 - 1 \quad (59)$$

It is thus clear that through appropriate choice of values for the electrical parameters R and C in accordance with the assumptions made hereinabove interval signal generating circuit 100a shown in FIG. 13a will produce electrically marked time intervals which represent the mathematical function $Y3.Y4 - 1$. Thus by utilizing circuit 100a as a particular embodiment of circuit 100 shown in FIG. 12, the output signal train produced by computing system 10c shown in FIG. 12 will represent the quantity $Y3.Y4 - 1$. Stated in another manner, when circuit 100a is utilized as a particular embodiment of circuit 100:

$$\not{p}_{f(Y3,Y4)} = \not{p}_{Y3.Y4-1} \quad (68)$$

Thus in the case in which circuit 100a is utilized the number represented by the output signal train $\not{p}_{f(Y3,Y4)}$ differs only by the additive constant −1 from the true product $Y3.Y4$ of the input quantities Y3 and Y4. It is sometimes desirable to generate a difunction signal train which represents the true product of input quantities Y3 and Y4 without any additive constant. One method of obtaining a signal train representing the true product $Y3.Y4$ would be to combine in a difunction adder a generated signal train representing the quantity +1 with the signal train $\not{p}_{Y3,Y4-1}$. In this manner the quantity $Y3Y4 - 1$ in difunction form may be effectively converted to a quantity proportional to $Y3Y4$ by the addition of the quantity +1. A difunction adder, suitable for the described application, is shown in FIG. 7a of U.S. Patent No. 2,898,040 for "Computer and Indicator System" to the present inventor, issued August 4, 1959.

Still another method of obtaining a signal train which represents the true product $Y3.Y4$ of input quantities Y3 and Y4 is to utilize in computing system 10c another embodiment 100b of signal generating circuit 100, which in operation produces an electrically defined time interval $x_{Y3Y4}$ directly representing the quantity $Y3.Y4$ rather than the quantity $Y3Y4 - 1$. A schematic diagram of circuit 100b is shown in FIG. 13b. It is seen that circuit 100b includes a first interval generating circuit 100a, described hereinbefore in connection with FIG. 13a, and a second interval generating circuit 110b. It will be assumed that in operation circuit 110b responds to actuation by producing an electrically marked time interval having a duration $$\frac{-N_2 T}{N_1 - N_2}$$

On the other hand as described in connection with FIG. 13a, circuit 100a responds to actuation by producing an interval signal which marks the end of a time interval $$\frac{(N_1 Y3.Y4) \cdot T}{N_1 - N_2}$$

Interval signals produced by circuit 100a are applied to the zero (Z) input terminal of a flip-flop $F_8$ while the interval signals produced by circuit 110b are applied to the set (S) input terminal of flip-flop $F_8$. The interval signals produced by circuit 110b are also utilized as the output interval signals for signal generating circuit 100b. Output signal $F^8$ of flip-flop $F_8$ is applied to one input terminal of an "and" gate 111 to whose other input terminal the actuating signal $A_{Y3Y4}$ for circuit 100b is applied, the output signal from "and" gate 111 serving as the actuating signal for circuit 100a. The complementary output signal $\overline{F}^8$ of flip-flop $F_8$ is applied to one terminal of an "and" gate 112 to whose other input terminal the actuating signal $A_{Y3Y4}$ is applied, the output signal from "and" gate 112 serving as the actuating signal for circuit 110b. Analog input signals $S_{Y3}$ and $S_{Y4}$ are applied to circuit 100a to control the magnitude of time interval $$\frac{(N_{Y3Y4}) \cdot T}{N_1 - N_2}$$

in accordance with the magnitude of $Y_3$ and $Y_4$.

In overall operation circuit 100b may be thought of as an adder for time intervals. In response to actuation by signal $A_{Y3Y4}$ circuit 100b produces the output interval signal $I_{Y3Y4}$ at a time interval after actuation which is equal to the sum of the time interval $$\frac{(N_1 Y_3 Y_4) T}{N_1 - N_2}$$

defined by circuit 100a and the time interval $$\frac{-N_2 T}{N_1 - N_2}$$

defined by circuit 110b. Restating this in algebraic terms:

$$x_{Y3Y4} = \frac{N_1 Y_3 Y_4 T}{N_1 - N_2} + \frac{-N_2 T}{N_1 - N_2} \quad (69)$$

where $x_{Y3Y4}$ is the time interval elapsing between the actuation of circuit 100b by actuating signal $A_{Y3Y4}$ and production of the corresponding time interval signal $I_{Y3Y4}$ by circuit 100b.

Combining terms in Equation 69 above there is obtained the equation:

$$x_{Y3Y4}=[N_1(Y3Y4)-N_2]\frac{T}{N_1-N_2} \qquad (70)$$

It can be seen from Equation 70 that the time interval $x_{Y3Y4}$ produced by summing the individual time intervals $$\frac{N_1Y_3Y_4T}{N_1-N_2}$$

and $$\frac{-N_2T}{N_1-N_2}$$

does indeed represent the product $Y3.Y4$, or in other words that for circuit 100b of FIG. 13b:

$$f_{(Y3,Y4)}=Y_3Y_4 \qquad (71)$$

The manner in which circuit 100b accomplishes the above-described summation of time intervals may be clarified by a brief example of its operation. Let it be assumed for the purposes of this example that at the time of actuation of circuit 100b flip-flop $F_8$ is initially in its 1-state so that signal $F^8$ is at its high level. Then at actuation when signal $A_{Y3Y4}$ rises to its high level the output signal from "and" gate 111 will rise to its high level actuating circuit 100a. In response to such actuation circuit 100a produces an interval signal at the time interval $$\frac{(N_1Y_3Y_4)T}{N_1-N_2}$$

after actuation, this interval signal being applied to flip-flop $F_8$ to set flip-flop $F_8$ to its 0-state. However, with flip-flop $F_8$ in its 0-state output signal $F^8$ will drop to its low level thus suspending actuation of circuit 100a while output signal $\overline{F^8}$ will rise to its high level causing actuation of circuit 110b. In response to this actuation (by the output signal from "and" gate 112) circuit 110b produces the interval signal $I_{Y3Y4}$ at the time interval $$\frac{-N_2T}{N_1-N_2}$$

after actuation. The interval signal $I_{Y3Y4}$ in addition to being applied to external circuitry is also applied to the set (S) input of flip-flop $F_8$ to reset flip-flop $F_8$ to its 1-state thereby returning flip-flop $F_8$ to its initial condition.

It is seen therefore that in overall operation circuits 100a and 110b are actuated in sequence so that the total time interval elapsing between actuation by signal $A_{Y3Y4}$ and production of the corresponding output interval signal $I_{Y3Y4}$ is equal to the sum of the individual time intervals associated with circuits 100a and 110b.

It is of some interest to evaluate the magnitude of these associated time intervals for the $+1$, $-1$ class of difunction representation. In this class of difunction representation the time interval associated with circuit 100a is:

$$\frac{(N_1Y_3Y_4)T}{N_1-N_2}=\frac{+1Y3Y4T}{1-(-1)}$$

$$=(Y3Y4)\cdot\frac{T}{2} \qquad (72)$$

On the other hand the time interval associated with circuit 110b is:

$$\frac{-N_2T}{N_1-N_2}=\frac{-(-1)T}{1-(-1)}$$

$$=\frac{+T}{2} \qquad (73)$$

The time interval $T/2$ associated with circuit 110b may be determined through appropriate choices of resistor and capacitor values in the mechanization of circuit 110b.

A third mathematical function, which will be considered in connection with computing system 10c shown in FIG. 12, is that function in which:

$$-f_{(Y3,Y4)}=Y_3+Y_4 \qquad (74)$$

A corresponding embodiment 100c of signal generating circuit 100 for producing a time interval representing the function set forth in Equation 74 is shown in FIG. 13c. It will be understood that in overall operation circuit 100c responds to actuation by producing an interval signal designated $I_{Y3+Y4}$ at a time interval $x_{Y3+Y4}$ after actuation, where:

$$x_{Y3+Y4}=[N_1(Y_3+Y_4)-N_2]\cdot\frac{T}{N_1-N_2} \qquad (75)$$

It is seen in FIG. 13c, that circuit 100c is generally similar to signal generating circuit 20 shown in FIG. 3 and comprises pulse generator 22 which produces the interval signal $I_{Y3+Y4}$ at a time interval after actuation controlled by a charging circuit 21e. The total charging resistance within charging circuit 21e is made up of two series connected variable resistive impedances generally designated $R_3$ and $R_4$ respectively. The magnitude of the time interval $x_{Y3+Y4}$ is therefore related to the magnitudes of $R_3$ and $R_4$ by the equation:

$$x_{Y3+Y4}=k(R_3+R_4).C \qquad (76)$$

where C is the magnitude of the fixed capacitor connected in series with $R_3$ and $R_4$.

It will be assumed that the magnitude of $R_3$ is controlled by analog signal $S_{Y_3}$ and that the magnitude of $R_4$ is controlled by analog signal $S_{Y_4}$, the relationship between $R_3$ and the quantity $Y_3$ being expressible by the following equation:

$$R_3=\frac{T}{kC(N_1-N_2)}\left(N_1Y_3-\frac{N_2}{2}\right) \qquad (77)$$

and the relationship between $R_4$ and the quantity $Y_4$ being expressible by the equation:

$$R_4=\frac{T}{kC(N_1-N_2)}\left(N_1Y_4-\frac{N_2}{2}\right) \qquad (78)$$

Substituting in Equation 76 the values for $R_3$ and $R_4$ from Equations 77 and 78 yields:

$$x_{Y3+Y4}=kC\left[\frac{T\left(N_1Y_3-\frac{N_2}{2}\right)}{kC(N_1-N_2)}+\frac{T\left(N_1Y_4-\frac{N_2}{2}\right)}{kC(N_1-N_2)}\right] \qquad (79)$$

which may be reduced to the equation:

$$x_{Y3+Y4}=[N_1(Y_3+Y_4)-N_2]\cdot\frac{T}{N_1-N_2} \qquad (80)$$

Equation 80 above indicates that, under the assumed conditions, the time interval $x_{Y3+Y4}$ will have the required duration, indicated by Equation 75, and will thereby represent the sum $Y_3+Y_4$ for all permissible values of $Y_3$ and $Y_4$. Stated in another manner, the time interval elapsing between actuation of circuit 100c and production of the corresponding interval signal $I_{Y3+Y4}$ will continuously represent the sum of $Y_3$ and $Y_4$.

In the foregoing paragraphs three embodiments of interval generating circuit 100 shown in FIG. 12 have been described in detail, these embodiments being circuits 100a, 100b and 100c shown in FIGS. 13a, 13b, and 13c, respectively. It has been demonstrated that when circuit 100a is utilized as a particular embodiment of circuit 100 then:

$$f_{(Y3,Y4)}=Y_3Y_4-1 \qquad (59)$$

When circuit 100b is utilized a different mathematical function is obtained represented by the equation:

$$f_{(Y3,Y4)}=Y_3Y_4 \qquad (71)$$

While when circuit 100c is utilized a third mathematical function is obtained as indicated by the equation:

$$f_{(Y_3,Y_4)} = Y_3 + Y_4 \qquad (74)$$

Those skilled in the art will readily perceive that many other mathematical functions may be mechanized in view of the detailed description supplied hereinabove in connection with FIGS. 13a, 13b and 13c.

It is now of some interest to consider a very much more complex computing system than any system heretofore described. Reference is therefore made to computing system 10d shown in FIG. 14 which receives analog signals $S_{Y_1}$, $S_{Y_2}$, $S_{Y_3}$, and $S_{Y_4}$ for producing an output difunction signal train $$\frac{\wp_{(Y_1 Y_2)+(Y_3+Y_4)}}{2}$$

which represents the quantity $$\frac{(Y_1 Y_2) + (Y_3 + Y_4)}{2}$$

It is seen that the output signal train produced by computing system 10d shown in FIG. 14 represents a fairly complicated mathematical function of the input quantities $Y_1$ through $Y_4$ represented by the analog input signals. As shown in FIG. 14 computing system 10d comprises an embodiment of interval signal generating apparatus 14 which furnishes interval signals demarking particular time intervals to an embodiment of computing apparatus 16 which utilizes the interval signals for the production of the output signal train and for the production of actuating signals which control the operations of interval signal generating apparatus 14.

As indicated in FIG. 14, generating apparatus 14 comprises three signal generating units, these being units 50a, 50b and 50c hereinbefore described, while the embodiment of computing apparatus 16 shown in FIG. 14 includes $I.\wp$ multiplying unit 52a and a pair of $I.1$ multiplying units 52b hereinbefore described. Also included within apparatus 16 are a pair of inverting amplifiers 200a and 200b, respectively, and a difunction adder 210 of the type described in the above-identified U.S. Patent No. 2,898,040. It is seen in FIG. 14 that analog signal $S_{Y_1}$ is applied to signal generating unit 50a, analog signal $S_{Y_2}$ is applied to signal generating unit 50b, while analog signals $S_{Y_3}$ and $S_{Y_4}$ are applied to signal generating unit 50c.

In the operation of computing system 10d signal generating unit 50a and the upper (as drawn) $I.1$ multiplying unit 52b are connected together so as to function as a converter which receives the analog signal $S_{Y_1}$ and transforms it into an equivalent output signal train $\wp_{Y_1}$ which represents in difunction form the input quantity $Y_1$. The output difunction signal $\wp_{Y_1}$ produced by (upper) multiplying unit 52b is applied as an input difunction signal train to the $I.\wp$ multiplying unit 52a. As shown in FIG. 14 units 50b and 52a are connected with one another so as to operate together as a multiplier which receives the analog signal $S_{Y_2}$ and the difunction signal $\wp_{Y_1}$ to produce an output difunction signal train $\wp_{Y_1 Y_2}$ which represents in difunction form the product $Y_1 Y_2$ of the two input quantities $Y_1$ and $Y_2$. Furthermore, as indicated in FIG. 14, signal generating unit 50c and the (lower) $I.1$ multiplying unit 52b are connected together so as to function as a computing system which receives the analog signals $S_{Y_3}$ and $S_{Y_4}$ and produces an output signal train $\wp_{Y_3+Y_4}$ which represents in difunction form the sum of the input quantities $Y_3$ and $Y_4$. It will be assumed in this connection that the embodiment of signal generating unit 50c shown in FIG. 14 includes therein circuit 100c shown in FIG. 13c.

Within computing unit 16 signal trains $\wp_{(Y_1 Y_2)}$ and $\wp_{(Y_3+Y_4)}$ are combined in difunction adder 210 to form an output difunction signal which represents one half the sum of the quantities represented by the input difunction signal trains to the difunction adder. The particular embodiment of difunction adder 210 shown in FIG. 14 requires as inputs not only both difunction signal trains but also signal trains complementary thereto. For the purposes of furnishing the complementary signal trains, signal train $\wp_{(Y_1 Y_2)}$ in addition to being directly applied to difunction adder 210 is also passed through inverting amplifier 200a to a separate input terminal of difunction adder 210. Similarly signal train $\wp_{(Y_3+Y_4)}$ is both applied directly to difunction adder 210 and through inverting amplifier 200b to a separate input terminal of difunction adder 210. Adder 210 in response to the direct and complementary signal trains produces the output signal train $$\frac{\wp_{(Y_1 Y_2)+(Y_3+Y_4)}}{2}$$

and also produces a complementary output signal train as indicated in FIG. 14.

What is claimed as new is:

1. In an electrical computing system operable upon a number of analog signals respectively representative of a corresponding number of input quantities: interval signal generating means receiving said analog signals and selectively actuable for producing a plurality of electrical interval signals, said generating means including generating apparatus selectively actuable in response to application of predetermined actuating signals for producing each interval signal at a time interval after actuation of said apparatus which is proportional to a predetermined function of the input quantities; computing means coupled to said interval signal generating means and responsive to said interval signals for producing an electrical output signal train representative of a predetermined function of the time intervals defined by said interval signals, said computing means including actuating means for producing said predetermined actuating signals and for selectively applying said actuating signals to said generating apparatus.

2. In an electrical system wherein a number of analog signals are generated respectively representative of a corresponding number of input quantities: interval signal generating means receiving said analog signals and selectively actuable for producing a plurality of electrical interval signals representing respectively a corresponding plurality of associated time intervals proportional to predetermined functions of the input quantities, said generating means including generating apparatus selectively actuable in response to application of predetermined actuating signals for producing each interval signal at the associated time interval after actuation of said generating means; and computing means coupled to said interval signal generating means and responsive to said interval signals for producing an output signal train representative of a predetermined function of the time intervals defined by said interval signals, said computing means including actuating means responsive to said interval signals for producing said actuating signals and for applying said actuating signals to said generating apparatus.

3. In an electrical computing system for operating upon a number of analog input signals representative of a corresponding number of input quantities to produce an output signal train representative of a predetermined function of said input quantities, the combination comprising: interval signal generating means receiving said analog signals and selectively actuable for producing a plurality of electrical interval signals respectively representative of time intervals proportional to predetermined mathematical functions of said input quantities, said generating means being operable at a predetermined time after each actuation for producing the selected interval signal; and computing means coupled to said generating means and responsive to said interval signals to produce the output signal train.

4. The combination defined in claim 3 wherein said interval signal generating means is actuated by application thereto of an electrical actuation signal, and including means for selectively applying electrical actuation signals to said interval signal generating means.

5. In an electrical computing system for operating upon a number of analog input signals representative of a corresponding number of input quantities to produce an output signal train representative of a predetermined function of said input quantities and synchronized with respect to an applied timing signal: interval signal generating means receiving said number of analog signals and selectively actuable for producing a corresponding number of electrical interval signals representing respectively a corresponding number of associated time intervals proportional to predetermined functions of the input quantities, said generating means being actuable in response to application of predetermined actuating signals for producing each selected interval signal at the associated time interval after actuation of said generating means; and computing means receiving said interval signals and the applied timing signals for producing predetermined actuating signals in accordance with the relative times of reception of said interval signals and the timing signals and for applying said actuating signals to said generating means to thereby cause the generating means to produce the associated selected interval signals, said computing means also including a computing circuit responsive to said interval signals and to the applied timing signals for producing the output signal train.

6. In an electronic computing device wherein numerical quantities are represented by corresponding serial signal trains of periodic bivalued electrical signals having a predetermined period T, each signal of a signal train having either a first value representing a first predetermined number $N_1$, or a second value representing a second predetermined number $N_2$, the numerical quantity represented by each signal train being equal to the mathematical average of the numbers represented by the signals in the train, a multiplying apparatus responsive to a signal train $\mathcal{P}_M$ representative of a quantity M, for producing a resultant electrical output signal train $\mathcal{P}_{YM}$ representative of the product of the quantity M and a quantity Y, said multiplying apparatus comprising: interval signal generating means selectively actuable for producing, at time intervals $x$, $x'$ and T after actuation thereof, electrical time interval signals I, I', and $I_T$ respectively, where $x$ is a time interval representative of the product $N_1Y$ and $x'$ is a time interval representative of the product $N_2Y$; and a computing apparatus, receiving said signal train $\mathcal{P}_M$ and responsive to signals I, I', and $I_T$ for producing during each period T a bivalued output signal, said computing apparatus including first means for actuating said generating means to produce time interval signal I when the signal of signal train $\mathcal{P}_M$ has said first value and time interval signal I' when the signal of signal train $\mathcal{P}_M$ has said second value, second means, operable whenever a pair of interval signals are produced by said generating means during the same period of signal train $\mathcal{P}_M$, for inhibiting the operation of said first means and actuating said generating means to produce said interval signal $I_T$, and third means for producing successive signals normally having a first value and having a second value only during the period immediately following the operation of said second means, the successive signals produced by said third means constituting output signal train $\mathcal{P}_{YM}$.

7. An electronic multiplying apparatus responsive to an input signal train $\mathcal{P}_M$ representing a first quantity M for producing an output signal train $\mathcal{P}_{YM}$ representing the product of the first quantity M and a second quantity Y, signal train $\mathcal{P}_M$ including a series of periodic bivalued signals having a period T and either a first value representing a predetermined number $N_1$ or a second value representing a predetermined number $N_2$, said multiplying apparatus comprising: interval signal generating means selectively actuable for producing, at time intervals $x$, $x'$, and T after actuation thereof, electrical time interval signals I, I', and $I_T$ respectively, where $x$ is a time interval having a duration proportional to $(N_1Y-N_2)$, and $x'$ is a time interval having a duration proportional to $(N_2Y-N_2)$; and a computing apparatus, receiving said signal train $\mathcal{P}_M$ and responsive to signals I, I', and $I_T$ for producing during each period T a bivalued output signal, said computing apparatus including first means for actuating said generating means to produce time interval signal I when the signal of signal train $\mathcal{P}_M$ has said first value and time interval signal I' when the signal of signal train $\mathcal{P}_M$ has said second value, second means, operable whenever a pair of interval signals are produced by said generating means during the same period of signal train $\mathcal{P}_M$, for inhibiting the operation of said first means and actuating said generating means to produce said interval signal $I_T$, and third means for producing a signal normally having a first value and having a second value only during the period immediately following the operation of said second means, the successive signals produced by said third means constituting output signal train $\mathcal{P}_{YM}$.

8. The multiplying apparatus defined in claim 7, wherein said numbers $N_1$ and $N_2$ are $+1$ and $-1$, respectively, and said first means is operable, when the signal of said signal train $\mathcal{P}_M$ is at said second level, to actuate said generating means to produce an interval signal I' at a time interval $x'$ proportional to the quantity $1-Y$.

9. An electronic multiplying apparatus responsive to an input signal train $\mathcal{P}_M$ representing a first quantity M for producing an output signal train $\mathcal{P}_{YM}$ representing the product of the quantity M and a second quantity Y, signal train $\mathcal{P}_{YM}$ including a series of periodic bilevel signals having a period T and either a first level representing a first predetermined number $N_1$ or a second level representing a second predetermined number $N_2$, said multiplying apparatus comprising: interval signal generating means selectively actuable for producing, at time intervals $x$, $x'$, and T after actuation thereof, electrical time interval signals I, I', and $I_T$ respectively, where $x$ is a time interval equal in duration to the quantity $$(N_1Y-N_2)\frac{T}{N_1-N_2}$$

and $x'$ is a time interval equal in duration to the quantity $$(N_2Y-N_2)\frac{T}{N_1-N_2}$$

and a computing apparatus, receiving said signal train $\mathcal{P}_M$ and responsive to signals I, I' and $I_T$ for producing during each period T a bilevel output signal, said computing apparatus including first means for actuating said generating means to produce time interval signal I when the signal of signal train $\mathcal{P}_M$ is at said first level and time interval signal I' when the signal of signal train $\mathcal{P}_M$ is at said second level, second means operable whenever a pair of interval signals are produced by said generating means during the same period of signal train $\mathcal{P}_M$, for inhibiting the operation of said first means and actuating said generating means to produce said interval signal $I_T$, and third means for producing a signal normally having a first level and having a second level only during the period immediately following the operation of said second means, the successive signals produced by said third means constituting output signal train $\mathcal{P}_{YM}$.

10. An electrical multiplier for receiving a bivalued electrical input signal train representing a first variable quantity M and producing a bivalued electrical output signal train representing the product of said first quantity M and a second variable quantity Y, said input signal train including $E_1$ signals each having a period T and representing a first predetermined number $N_1$ and $E_2$ signals each having said period T and representing a second predetermined number $N_2$, the quantity M being equal to $$\frac{E_1N_1+E_2N_2}{E_1+E_2}$$

said multiplier comprising: electrical interval signal generating means selectively actuable to generate either a first time interval signal I, or a second time interval signal I', said generating means being operable for generating signals I and I' after actuation at time intervals $x$ and $x'$, respectively representative of the quantities $(N_1Y-N_2)T$ and $(N_2Y-N_2)T$, respectively; means, responsive to said input signal train, for actuating said interval signal generating means to produce $E_1$ first time interval signals and $E_2$ second time interval signals; and means, coupled to said interval signal generating means and responsive to said first and second time interval signals, for producing a bivalued electrical output signal train having $(E_1+E_2)$ periods T and including $$1/T.[E_1x+E_2x']$$

signals representing said first number $N_1$.

11. In an electrical multiplier for receiving a bivalued electrical signal train representing a first quantity M and producing a signal representing the product of said first quantity M and a second quantity Y, said signal train including $E_1$ signals each having a period T and representing a first predetermined number $N_1$ and $E_2$ signals each having said period T and representing a second predetermined number $N_2$, the quantity M being equal to $$\frac{E_1N_1+E_2N_2}{E_1+E_2}$$

the combination comprising electrical interval signal generating means, selectively actuable in response to application of actuating signals A, A', and $A_T$ for generating electrical interval signals demarking time intervals $x$, $x'$, and $x_T$, respectively, representative of the quantities $(N_1Y-N_2)T$, $(N_2Y-N_2)T$, and T, respectively, and means, responsive to said signal train, for applying to said interval signal generating means $E_1$ actuating signals A, $E_2$ actuating signals A' and K actuating signals $A_T$, K being a predetermined integer, to produce at said interval generating means a plurality of interval signals representing a composite time interval of $(E_1+E_2)T$.

12. The combination defined in claim 11 wherein the last-named means includes means for generating $$\frac{E_1N_1(1-Y)+E_2(N_1-N_2Y)}{N_1-N_2}$$

actuating signals $A_T$.

13. In an electronic computing device wherein numerical quantities are represented by corresponding serial difunction signal trains of periodic bivalued electrical signals having a predetermined period T, every bivalued signal in a difunction signal train representing either a predetermined first number or a predetermined second number, a multiplying apparatus, responsive to a difunction signal train $\mathcal{D}_M$ representative of a quantity M, for producing a resultant output electrical difunction signal train $\mathcal{D}_{YM}$ representative of the product of said quantity M and a quantity Y, said multiplying apparatus comprising: interval signal generating means selectively actuable in response to the application of predetermined interval actuating signals A and A' and a period actuating signal $A_T$ for producing corresponding electrical interval signals I, I' and $I_T$ respectively, at corresponding time intervals $x$, $T-x$, and T respectively after actuation of said generating means, where $x$ is a time interval which is representative of the quantity Y; and a computing apparatus receiving said signal train $\mathcal{D}_M$ and responsive to signals I, I' and $I_T$ for normally applying the interval actuating signals A and A' selectively to said generating means in accordance with the value of each bivalued signal of signal train $\mathcal{D}_M$, said computing apparatus being inhibited in its normal operation whenever a pair of interval signals are produced by said generating means during the same period of signal train $\mathcal{D}_M$, said computing apparatus including first means being responsive to the second interval signal of said pair for applying the period actuating signal $A_T$ to said generating means, said computing apparatus also including second means for producing during each period a bivalued output signal normally having a first value and having a second value only when the period actuating signal $A_T$ was applied to the generating means during the preceding period, the successive electrical output signals produced by said computing apparatus thereby comprising the difunction signal train $\mathcal{D}_{YM}$.

14. In an electronic computing device wherein numerical quantities are represented by corresponding serial difunction signal trains of periodic bivalued electrical signals having a predetermined period T, every bivalued signal in a difunction signal train representing either a positive or negative number of predetermined magnitude, the numerical quantity represented by a difunction signal train being equal to the algebraic average of the positive and negative numbers represented by the electrical signals in the difunction signal train, a multiplying system, responsive to an input difunction signal train $\mathcal{D}_M$ representative of a first quantity M, for producing a resultant output electrical difunction signal train $\mathcal{D}_{YM}$ representative of the product of said first quantity M and a second quantity Y, said multiplying system comprising: interval signal generating means selectively actuable in response to the application of predetermined actuating signals A, A' and $A_T$ for producing corresponding electrical interval signals I, I' and $I_T$ respectively, at corresponding time intervals $x$, $T-x$, and T respectively after actuation of said generating means, where $x$ is a time interval which is representative of the second quantity; and a computing apparatus receiving said signal train $\mathcal{D}_M$ and responsive to signals I, I' and $I_T$ for normally applying signals A and A' selectively to said generating means in accordance with the value of each signal of signal train $\mathcal{D}_M$, said computing apparatus being inhibited in its normal operation whenever a pair of interval signals are produced by said generating means during the same period of signal train $\mathcal{D}_M$, said computing apparatus including first means responsive to the second interval signal of each pair for applying signal $A_T$ to said generating means, said computing apparatus also including second means for producing during each period a bivalued electrical output signal normally having a first value and having a second value only when signal $A_T$ was applied to the generating means during the preceding period, the successive electrical output signals produced by said computing apparatus thereby comprising the difunction signal train $\mathcal{D}_{YM}$.

15. In an electronic computing device wherein numerical quantities are represented by corresponding serial difunction signal trains of periodic bivalued electrical signals having a predetermined period T, every bivalued signal in a difunction signal train representing either a positive or negative number of predetermined magnitude, the numerical quantity represented by a difunction signal train being equal to the algebraic average of the positive and negative numbers represented by the electrical signals in the difunction signal train, a multiplying apparatus, responsive to an analog input signal representative of an input quantity Y and to an input difunction signal train $\mathcal{D}_M$ representative of an input quantity M, for producing a resultant output electrical difunction signal $\mathcal{D}_{YM}$ representative of the product YM, said multiplying apparatus comprising: interval signal generating means receiving said analog signal and selectively actuable in response to the application of predetermined interval actuating signals A and A' and a period actuating signal $A_T$ for producing corresponding electrical interval signals I, I' and $I_T$ respectively associated with corresponding time intervals $$\frac{T}{2}(1+Y), \frac{T}{2}(1-Y)$$

and T, respectively, each interval signal being produced at a time proportional to the associated time interval after actuation of said generating means; and a computing apparatus receiving said signal train $\mathcal{P}_M$ and responsive to signals I, I' and $I_T$ for normally applying the interval actuating signals A and A' selectively to said generating means in accordance with the value of each signal of signal train $\mathcal{P}_M$, said computing apparatus being inhibited in its normal operation whenever two interval signals are produced by said generating means during this same period of signal train $\mathcal{P}_M$, said computing apparatus being responsive to the second interval signal for applying the period actuating signal $A_T$ to said generating means, said computing apparatus including means for producing during each period a bivalued output signal normally having a first value and having a second value only when the period actuating signal $A_T$ was applied to the generating means during the preceding period, the successive electrical output signals produced by said computing apparatus thereby comprising the difunction signal train $\mathcal{P}_{YM}$.

16. An electronic converter for producing electrical time interval signals having a duration representing an algebraic number Y and for converting the time interval signals into an equivalent electrical signal train of a series of bivalued electrical signals having a predetermined period T, each signal of the train having either a first value representing a first predetermined number $N_1$ or a second predetermined number $N_2$, the total number represented by the signal train being equal to the average of the numbers represented by the series of bivalued signals, said converter comprising: first interval signal generating means responsive to an applied electrical actuating signal for generating an electrical time interval signal I at a time after actuation proportional to the function $$(N_1Y - N_2)\frac{T}{N_1 - N_2}$$

second interval signal generating means responsive to an applied electrical actuating signal for generating an electrical time interval signal $I_T$ at a time after actuation proportional to T and a signal generator, responsive to interval signals I and $I_T$, for applying actuating signals to said interval signal generating means and for generating the electrical signal train, said signal generator including first means for applying an actuating signal to said first interval signal generating means upon receipt of a first interval signal, during each period T, and for applying an actuating signal to said second interval signal generating means upon receipt of a second interval signal during a single period T, and second means normally generating a bivalued signal having the first value during each period T and having the second value during each period T following the application of an actuating signal to said second interval signal generating means.

17. An electronic converter for producing electrical time interval signal having a duration representing an algebraic number Y and for converting the time interval signals into an equivalent electrical signal train of a series of bivalued electrical signals having a predetermined period T, each signal of the train having a first value representing the number one or a second level representing a predetermined number $N_2$ the total number represented by the signal train being equal to the mathematical average of the numbers represented by the series of bivalued signals, said converter comprising: first interval signal generating means responsive to an applied electrical actuating signal for generating an electrical time interval signal I at a time after actuation proportional to the function $$(Y - N_2)\frac{T}{1 - N_2}$$

second interval signal generating means responsive to an applied electrical actuating signal for generating an electrical time interval signal $I_T$ at a time after actuation proportional to T; and a signal generator, responsive to interval signals I and $I_T$, for applying actuating signals to said interval signal generating means and for generating the electrical signal train, said signal generator including first means for applying an actuating signal to said first interval signal generating means upon receipt of a first interval signal, during each period T, and for applying an actuating signal to said second interval signal generating means upon receipt of a second interval signal during a single period T, and second means normally generating a bivalued signal having the first value during each period T and having the second value during each period T following the application of an actuating signal to said second interval signal generating means.

18. In an electrical system for representing the magnitude of an applied analog signal as a series of periodic bivalued electrical signals having a period T, each bivalued signal having either a first value representing a first predetermined number or a second value representing a second predetermined number, the total number represented by the series being proportional to the algebraic average of the numbers represented by the signals of the series, the combination comprising: first interval signal generating means receiving the analog signal and actuable by an applied electrical actuating signal for generating an electrical signal at a time after actuation representative of the magnitude of the analog quantity; second interval signal generating means, actuable by an applied electrical actuating signal, for generating an electrical signal at a time after actuation representative of the period T; and electrical control means, electrically connected to said first and second interval signal generating means and receiving the signals generated thereby, for controlling the actuation of said generating means, said control means including first means for applying one actuating signal to said first generating means during each period T, and second means for applying one actuating signal to said second generating means whenever two electrical signals are received by said control means during the same period T.

19. An electrical system for representing the magnitude of an analog quantity as a series of periodic bivalued electrical signals, each signal having a period T and either a first value representing a first predetermined number or a second value representing a second predetermined number, the total number represented by the series being the average of the numbers represented by the signals of the series, said system comprising: first generating means for generating an electrical output signal having a duration representative of the magnitude of the analog quantity; second generating means for generating an electrical output signal representative of the period T; and bistable signal generating means, electrically connected to said first and second generating means, for receiving said output signals and producing said series of periodic bivalued electrical signals.

20. The system defined in claim 19 wherein each of said first and second generating means is actuable to generate the associated output signal upon application of an electrical actuating signal, and said bistable signal generating means includes means for applying one actuating signal to said first generating means during each period T.

21. The system defined in claim 20 wherein said bistable signal generating means further includes means for applying an actuating signal to said second generating means in response to receipt of two output signals in a single period T.

22. For use in an electronic computer, a time interval signal generator for generating an electrical time interval signal having a duration corresponding to the condition of a variable-condition input device, said generator comprising: generating means including at least one variable impedance element, said generating means being responsive to an applied electrical input signal for generating an electrical time interval signal at a time interval after application of an electrical input signal directly proportional to the impedance of said variable impedance element; means for varying the impedance of said variable impedance element in accordance with the condition of the input device; and means for selectively applying electrical input signals to said generating means.

23. In an electronic computing system, a selectively operable time interval signal generator for generating a time interval signal corresponding to the condition of a variable condition input device, said generator comprising: generating means including at least one element having a variable magnitude parameter, said generating means being actuable in response to an applied input signal for generating a time interval signal at a time interval after actuation which is directly proportional to the magnitude of the parameter of said element; means for varying the parameter of said element in accordance with the condition of the input device; and means for selectively applying input signals to said generating means.

24. A selectively operable signal generator for generating a time interval signal corresponding to the result of one of the mathematical operations of addition and multiplication upon numbers represented by the conditions of first and second variable condition input devices, said generator comprising: interval signal generating means including first and second electrical elements, each having a variable electrical parameter, said generating means being actuable in response to an applied input signal for generating a time interval signal at a time interval after actuation which is proportional to the result of said one mathematical operation upon the numbers represented by the magnitudes of the electrical parameters of said elements; means for varying the electrical parameters of said first and second elements in accordance with the conditions of the first and second input devices, respectively; and means for selectively applying input signals to said generating means.

25. The signal generator defined in claim 24 wherein said first and second electrical elements are electrical components having similar voltage-current response characteristics, and said time interval is directly proportional to the sum of the impedances of said components.

26. The signal generator defined in claim 24 wherein said first and second electrical elements are electrical components whose voltage characteristics are different functions of the currents applied thereto, and said time interval is directly proportional to the product of the magnitudes of the parameters of said components.

27. An electrical computing system for operating upon an applied analog input signal representative of a corresponding input quantity to produce an electrical output signal train representative of a predetermined function of the input quantity, said system comprising: interval signal generating means receiving the analog signal and actuable for producing electrical interval signals, said generating means including generating apparatus selectively actuable for producing each interval signal at a time interval after actuation of said generating means proportional to the predetermined function of the input quantity; and computing means, coupled to said interval signal generating means, and responsive to said interval signals for producing an electrical output signal train representative of a predetermined function of the time interval defined by the interval signals.

28. The computing system defined by claim 27 wherein said interval signal generating means is actuated by application thereto of predetermined electrical actuating signals, and means including for applying the predetermined electrical actuating signals to said signal generating means.

29. The computing system defined by claim 27 wherein said interval signal generating means is actuated by application thereto of a predetermined electrical actuating signal, said computing means including an actuating circuit, responsive to said interval signals, for producing the predetermined actuating signals and applying said actuating signals to said interval signal generating means.

References Cited in the file of this patent

UNITED STATES PATENTS

| | | |
|---|---|---|
| 2,185,192 | Hansell | Jan. 2, 1940 |
| 2,357,371 | Wolfner | Sept. 5, 1944 |
| 2,405,843 | Moe | Aug. 13, 1946 |
| 2,422,696 | Meacham | June 24, 1947 |
| 2,461,895 | Hardy | Feb. 15, 1949 |
| 2,542,631 | Crain | Feb. 20, 1951 |
| 2,543,442 | Dench | Feb. 27, 1951 |
| 2,574,437 | Reed | Nov. 6, 1951 |
| 2,589,085 | Houghton | Mar. 11, 1952 |
| 2,600,270 | Saunders | June 10, 1952 |
| 2,616,965 | Hoeppner | Nov. 4, 1952 |
| 2,643,819 | Yuk Wing Lee | June 30, 1953 |
| 2,652,194 | Hirsch | Sept. 15, 1953 |
| 2,661,153 | Vance | Dec. 1, 1953 |
| 2,665,411 | Frady | Jan. 5, 1954 |
| 2,710,348 | Baum | June 7, 1955 |
| 2,730,815 | Gallo | Jan. 17, 1956 |
| 2,753,503 | Wideroe | July 3, 1956 |
| 2,773,641 | Baum | Dec. 11, 1956 |
| 2,787,418 | MacKnight et al. | Apr. 2, 1957 |
| 2,828,910 | Fagot | Apr. 1, 1958 |
| 2,839,244 | McCoy | June 17, 1958 |
| 2,897,486 | Alexander et al. | July 28, 1959 |

OTHER REFERENCES

Terman: "Radio Engineer's Handbook," McGraw-Hill Book Co., Inc., New York, 1943, pp. 505 to 506 relied on.